(12) United States Patent
Nakagawa et al.

(10) Patent No.: US 7,744,804 B2
(45) Date of Patent: Jun. 29, 2010

(54) LASER-TRANSMISSIBLE COMPOSITION AND METHOD OF LASER WELDING

(75) Inventors: Osamu Nakagawa, Neyagawa (JP); Makiko Matsui, Neyagawa (JP)

(73) Assignee: Orient Chemical Industries, Ltd., Osaka (JP)

( * ) Notice: Subject to any disclaimer, the term of this patent is extended or adjusted under 35 U.S.C. 154(b) by 1057 days.

(21) Appl. No.: 11/073,731

(22) Filed: Mar. 8, 2005

(65) Prior Publication Data

US 2005/0203225 A1 Sep. 15, 2005

(30) Foreign Application Priority Data

Mar. 12, 2004 (JP) ............... 2004-071223

(51) Int. Cl.
*H05B 6/00* (2006.01)
*B32B 7/12* (2006.01)
*C08K 5/16* (2006.01)
*C08K 5/23* (2006.01)
*C09B 67/00* (2006.01)

(52) U.S. Cl. ............... 264/482; 524/186; 524/190

(58) Field of Classification Search ........... 524/190, 524/186; 264/482
See application file for complete search history.

(56) References Cited

U.S. PATENT DOCUMENTS

| 4,619,990 | A | * | 10/1986 | Elmasry ............... 534/573 |
| 5,512,416 | A | * | 4/1996 | Namba et al. ........ 430/270.21 |
| 5,837,761 | A | * | 11/1998 | MacPherson et al. ..... 524/190 |
| 6,221,963 | B1 | * | 4/2001 | Kobayashi et al. ........ 525/191 |
| 6,379,604 | B1 | * | 4/2002 | Evans et al. ............ 264/400 |
| 6,762,224 | B2 | * | 7/2004 | Feiler et al. ............ 524/87 |
| 6,858,665 | B2 | * | 2/2005 | Larson ................ 524/445 |
| 7,053,140 | B2 | * | 5/2006 | Koshida et al. .......... 524/190 |
| 7,094,263 | B2 | * | 8/2006 | Pyles et al. .............. 8/552 |
| 7,153,384 | B2 | * | 12/2006 | Sugawara et al. ...... 156/272.8 |
| 7,342,062 | B2 | * | 3/2008 | Tada et al. ............ 524/190 |
| 2002/0045698 | A1 | * | 4/2002 | Ayama et al. ........... 524/515 |
| 2002/0156161 | A1 | * | 10/2002 | Koshida et al. .......... 524/190 |
| 2003/0003296 | A1 | * | 1/2003 | Dries et al. ............ 428/336 |

(Continued)

FOREIGN PATENT DOCUMENTS

DE 3723800 2/1989

(Continued)

OTHER PUBLICATIONS

Holden, Elastomers, Thermoplastic, Enc. of Poly. Sci. and Tech. John Wiley and Sons, Inc., 2002.*

(Continued)

*Primary Examiner*—Mark Eashoo
*Assistant Examiner*—Liam J Heincer
(74) *Attorney, Agent, or Firm*—Steptoe & Johnson LLP

(57) ABSTRACT

A laser-transmissible composition comprises:
a dynamic crosslinking polyolefin thermoplastic elastomer that has a melting point ranging from 160 to 210 degrees Centigrade in case of non-coloring,
and dye salt exhibiting transmission of a laser having a wavelength of 800 to 1200 nm.

A method for laser welding comprises:
putting a laser-transmissible molded workpiece 1 made from the laser-transmissible composition onto a laser-absorptive molded workpiece 2 having a laser-absorbent 7,
irradiating laser 3 towards the laser-transmissible molded workpiece 1 to weld the laser-transmissible molded workpiece 1 and the laser-absorptive molded workpiece 2.

13 Claims, 2 Drawing Sheets

U.S. PATENT DOCUMENTS

| | | | |
|---|---|---|---|
| 2003/0045618 A1* | 3/2003 | Koshida et al. | 524/358 |
| 2003/0065074 A1 | 4/2003 | Koshida et al. | |
| 2003/0068497 A1* | 4/2003 | Koshida et al. | 428/411.1 |
| 2003/0088076 A1* | 5/2003 | Koshida et al. | 534/653 |
| 2003/0125429 A1* | 7/2003 | Joachimi et al. | 524/105 |
| 2003/0130381 A1* | 7/2003 | Joachimi et al. | 524/88 |
| 2003/0141002 A1* | 7/2003 | Flanagan | 156/64 |
| 2003/0143352 A1* | 7/2003 | Yang et al. | 428/36.9 |
| 2004/0030384 A1* | 2/2004 | Wissman | 623/11.11 |
| 2004/0045663 A1* | 3/2004 | Katayama et al. | 156/272.8 |
| 2004/0082692 A1* | 4/2004 | Koshida et al. | 524/190 |
| 2004/0110880 A1 | 6/2004 | Sugawara et al. | |
| 2004/0144483 A1 | 7/2004 | Sugawara et al. | |
| 2005/0003301 A1 | 1/2005 | Sugawara et al. | 430/270.1 |
| 2005/0081991 A1 | 4/2005 | Hatase et al. | 156/272.8 |
| 2006/0142451 A1* | 6/2006 | Yushina et al. | 524/358 |
| 2006/0155067 A1* | 7/2006 | Motoshige et al. | 525/191 |
| 2007/0056684 A1* | 3/2007 | Yamamoto et al. | 156/272.8 |
| 2007/0129475 A1* | 6/2007 | Sakata et al. | 524/306 |
| 2007/0292651 A1* | 12/2007 | Sugawara et al. | 428/57 |
| 2008/0108736 A1* | 5/2008 | Tsukada | 524/190 |

FOREIGN PATENT DOCUMENTS

| | | |
|---|---|---|
| DE | 4109663 | 9/1992 |
| DE | 10054859 A1 * | 5/2002 |
| JP | 11-170371 | 6/1999 |
| JP | 2002228830 | 8/2002 |
| WO | WO 2004/072175 | 8/2004 |

OTHER PUBLICATIONS

Machine translation of DE 10054859 A1 (EPO website).*
Noordermeer, Ethylene-Propylene elastomers, Enc. of Poly. Sci. and Tech. John Wiley and Sons, Inc., 2002.*
C. Radesh Kumar et al., "Blends of Nylon/Acrylonitridile Butadiene Rubber: Effects of Blend Ratio, Dynamic Vulcanization and Reactive Compatibilization of Rheology and Extrudate Morphology," Polymer Engineering and Science, vol. 43, No. 9, Sep. 2003, pp. 1555-1565.
A. Mousa et al.,"Oil-Resistance Studies of Dynamically Vulcanized Poly (vinyl chloride)/Epoxidized Natural Rubber Thermoplastic Elastomer," Journal of Applied Polymer Science, vol. 69, No. 7, 1998, pp. 1357-1366.

* cited by examiner

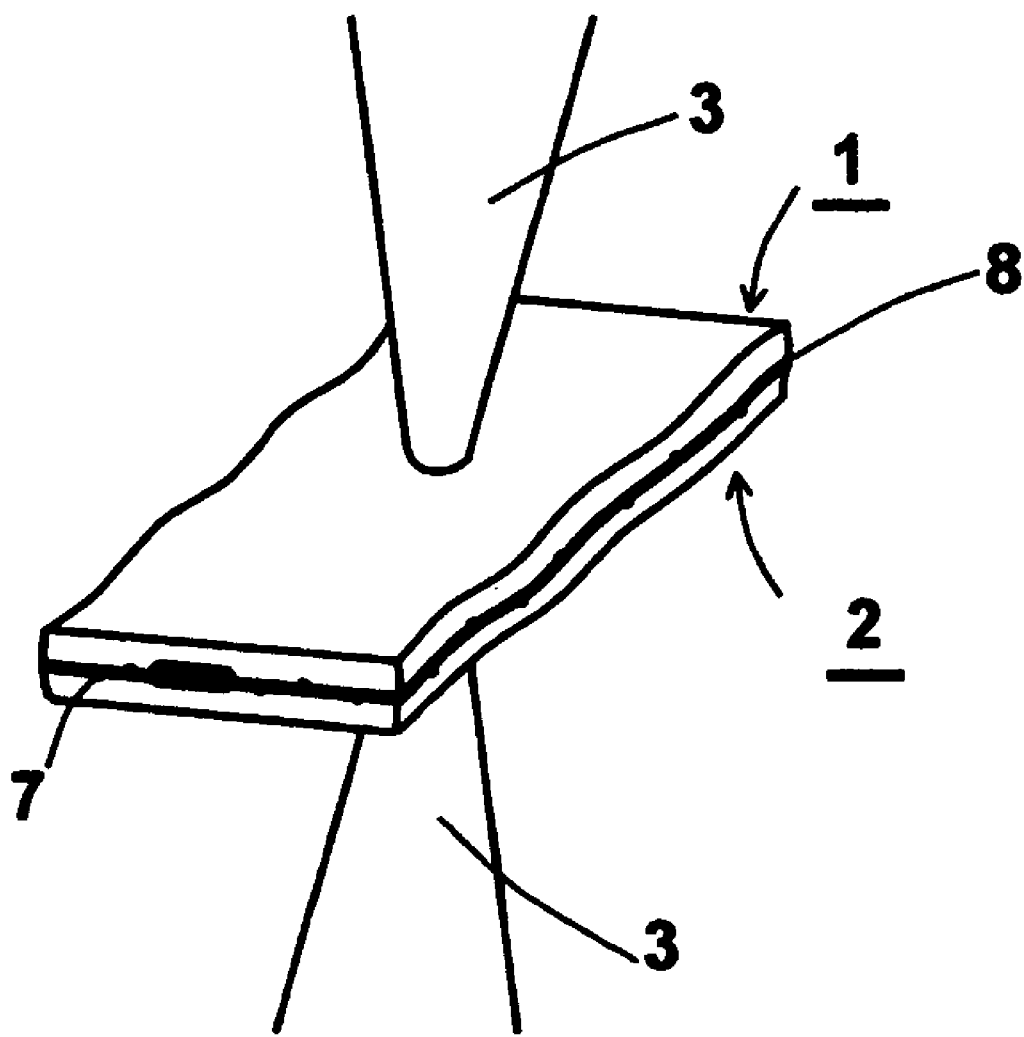

LASER-TRANSMISSIBLE COMPOSITION AND METHOD OF LASER WELDING

BACKGROUND OF THE INVENTION

This invention relates to a laser-transmissible composition including a dynamic crosslinking polyolefin thermoplastic elastomer for forming of a laser-transmissible molded workpiece and a method for laser welding of the molded workpiece made from it.

A thermoplastic elastomer is a synthetic polymerized material having a property of plastic like a thermoplastic resin that softens under high temperature, and a property of rubber that exhibits elasticity under room temperature. The thermoplastic elastomer can perform injection-molding as same as the thermoplastic resin to form moldings having various shape. Further it attains excellent productivity and recycling. Therefore it is used generally as materials for the moldings that takes midway roles between the rubber and the plastic such as the thermoplastic resin in extensive fields of automobile industry, electric industry, electronic industry and so on.

The thermoplastic elastomer includes mostly the rubber component as a soft segment such as styrene-butadiene copolymer rubber (SBR), ethylene-propylene-diene-methylene copolymer (EPDM) and acrylonitrile-butadiene copolymer rubber (NBR). Furthermore it includes the thermoplastics component as a hard segment such as polyolefins, polystyrenes, poly(vinyl chlorides), polyesters, polyamides and polyurethanes.

Especially, a polyolefin thermoplastic elastomer (TPO) is most used as the material for moldings because it is available at low manufacturing cost and has excellent properties such as tensile strength, elongation at break and tension set. The polyolefin thermoplastic elastomer includes the plastic component such as the thermoplastic resin of polypropylene and polyethylene, and the rubber component such as polyolefin. It is prepared by merely blending, polymerization, or crosslinking.

For joining mutually molded workpieces made from the thermoplastic resin such as polypropylene, a method for laser welding is known. The laser welding is executed for example as described in Japanese Patent Provisional Publication No. 11-170371. A laser-transmissible molded workpiece made from the thermoplastic resin and a laser-absorptive molded workpiece made from a thermoplastic resin are put together. Laser is irradiated from the laser-transmissible molded workpiece side to transmit. The laser transmits to the laser-absorptive molded workpiece, is absorbed thereto and causes the exothermic. Both molded workpieces are melted at put portion thereof together by the exothermic to weld. For executing the laser welding with sufficient welding strength, it is necessary that the laser-transmissible molded workpiece has high laser-transmittance to cause sufficiently transmitting of the laser and then the exothermic.

However the polyolefin thermoplastic elastomer tends to have lower laser-transmittance than the thermoplastic resin such as polypropylene and polyamide having a sufficient laser-transmissible property, because it has been denaturalized by blending, polymerization or closslinking.

Further the polyolefin thermoplastic elastomer is gradually oxidized or deteriorated to yellow. It is necessary to be colored beforehand with pigment of colorant, for making the yellow inconspicuous or for classifying orderly by coloring.

A composition including the pigment must have the still lower laser-transmittance because of the pigment that immensely obstructs the laser-transmissible property. As consequence, there are a few problems. When the laser-transmissible molded workpiece made from the polyolefin thermoplastic elastomer is executed with the laser welding, it is welded without the sufficient strength, in comparison with using the laser-transmissible molded workpiece made from the thermoplastic resin.

Further if the laser welding thereof is executed by the considerable strong output of the laser to make up for the lower laser-transmittance and to transmit the sufficient laser, overheating on the surface of the molded workpiece causes burnout, deterioration and spoiling of smoothness.

On the other hand, the laser-transmissible molded workpieces made from the polyolefin thermoplastic elastomer colored with known oily dyestuffs that do not obstruct the laser-transmissible property so much instead of the pigment of the colorant, are easy to be discolored under molding and welding. Further if the welded workpieces are left under high temperature and high humidity, the dyestuffs cause remarkably a bleeding property (i.e. a migrating property) from the laser-transmissible molded workpiece into the laser-absorptive molded workpiece made from the thermoplastic resin or the polyolefin thermoplastic elastomer. As consequence, it causes spoiling of appearance.

SUMMARY OF THE INVENTION

The present invention has been developed to solve the foregoing problems.

It is an object of the present invention to provide a laser-transmissible composition for forming of a laser-transmissible molded workpiece that includes a dynamic crosslinking polyolefin thermoplastic elastomer colored distinctly and does not discolor and bleed through a heat treatment process such as injection-molding.

It is another object of the present invention to provide a method for laser welding of the molded workpiece made from the composition with sufficient tensile strength and prettiness by efficient energy.

A laser-transmissible composition of the present invention developed for accomplishing the foregoing object, comprises:

a dynamic crosslinking polyolefin thermoplastic elastomer (TPV) that has a melting point ranging from 160 to 210 degrees Centigrade in case of non-coloring, and dye salt exhibiting transmission of a laser having a wavelength of 800 to 1200 nm.

The laser-transmissible composition is prepared by mixing the non-colored dynamic crosslinking polyolefin thermoplastic elastomer that has the melting point ranging from 160 to 210 degrees Centigrade and the dye salt. Molding the laser-transmissible composition gives a laser-transmissible molded workpiece 1, as shown in FIG. 1 for instance. The elastomer having the melting point ranging from 160 to 210 degrees Centigrade has excellent dispersibility and obstruction of deteriorating the colorant. The laser-transmissible composition including the elastomer causes the glossy and excellent surface and appearance thereof. It solves the problems.

Measuring the melting point is in accordance with ISO (International Organization for Standardization) 1133 as follows. The dynamic crosslinking polyolefin thermoplastic elastomer is set on Flow Tester CFT-500D that is available from Shimadzu Corporation. Temperature of melting of the dynamic crosslinking polyolefin thermoplastic elastomer is measured under conditions that load is 5 kgf, a hole of a die has 1 mm of the length and 1 mm of the diameter, and the rising temperature rate is 5 degrees Centigrade per minute from 150 to 250 degrees Centigrade.

A method for determining the melting point is as follows. A half point between the outflow termination and minimum is analyzed by using the flow curve thereof. The temperature at the half point regards as the melting point. It is namely the half-method.

In the laser-transmissible composition, it is preferable that the dynamic crosslinking polyolefin thermoplastic elastomer has a value of compressive strain ranging from 20 to 70% at 100 degrees Centigrade in accordance with Japanese Industrial Standard K-6262-1997.

With regard to the laser-transmissible composition, it is preferable that the wavelength of the laser is 840 nm, and transmittance of the dynamic crosslinking polyolefin thermoplastic elastomer at said wavelength is at least 35%.

The dye salt is preferably at least selected from the group consisting of a monoazo dye salt, a disazo dye salt, an anthraqunone dye salt, an anthrapyridone dye salt and a triphenylmethane dye salt.

With regard to the laser-transmissible composition, the dynamic crosslinking polyolefin thermoplastic elastomer is prepared under presence of a metallocene catalyst.

With regard to the laser-transmissible composition, it is preferable that the dynamic crosslinking polyolefin thermoplastic elastomer has Shore hardness ranging from 60 to 90 (A).

With regard to the laser-transmissible composition, it is further preferable that the dynamic crosslinking polyolefin thermoplastic elastomer includes a main component of ethylene-alpha-olefin copolymer elastomer.

It is furthermore preferable that the ethylene-alpha-olefin copolymer elastomer has a copolymer ratio of the ethylene towards the alpha-olefin ranging from 55:45 to 80:20 by weight.

A laser-absorptive composition comprises:
a dynamic crosslinking polyolefin thermoplastic elastomer that has a melting point ranging from 160 to 210 degrees Centigrade in case of non-coloring,
and a laser-absorbent.

With regard to the laser-absorptive composition, example of the laser-absorbent is carbon black.

In the laser-absorptive composition, it is preferable that the dynamic crosslinking polyolefin thermoplastic elastomer includes a main component of ethylene-alpha-olefin copolymer elastomer.

The laser-absorptive composition may comprise talc.

It is explained with reference to the FIG. 1 corresponding to an embodiment.

A method for laser welding comprises:
putting a laser-transmissible molded workpiece 1 made from the above-mentioned laser-transmissible composition onto a laser-absorptive molded workpiece 2 having a laser-absorbent 7,
irradiating laser 3 towards the laser-transmissible molded workpiece 1 to weld the laser-transmissible molded workpiece 1 and the laser-absorptive molded workpiece 2.

As shown in FIG. 2 with regard to the method for laser welding, the laser-transmissible molded workpieces 1 may be welded by the laser onto both surfaces of the laser-absorptive molded workpiece 2.

As shown in FIG. 3 with regard to the method for laser welding, the laser-transmissible molded workpiece 1 may be put onto the laser-absorptive molded workpiece 2 through an applied layer 8 having the laser-absorbent 7.

In the method for laser welding, the laser-absorptive molded workpiece 2 may be made from a composition including a dynamic crosslinking polyolefin thermoplastic elastomer and the laser-absorbent 7.

The laser-absorptive molded workpiece 2 may be made from a composition including a thermoplastic resin and the laser-absorbent.

Example of the thermoplastic resin in the laser-absorptive molded workpiece 2 is polypropylene resin.

In the composition including the thermoplastic resin and the laser-absorbent, the thermoplastic resin includes talc.

With regard to the method for laser welding, the laser 3 is irradiated with scanning, and a quantity of heat: K(J/mm$^2$) for supplying on surface of the laser-absorptive molded workpiece 2 provides for the following numerical expression (I).

$$K=(p\times T)/(100\times q\times d)\geqq 0.5 \tag{I}$$

(in the numerical expression (I), p(W) is output of the laser 3, T(%) is transmittance of the laser-transmissible molded workpiece 1 under irradiation of the laser, q(mm/sec.) is scanning speed of the laser, d(mm) is diameter of irradiating spot of the laser 3 on the surface.)

A laser-welded article comprising:
the laser-absorptive molded workpiece made from the composition including the dynamic crosslinking polyolefin thermoplastic elastomer that has the melting point ranging from 160 to 210 degrees Centigrade in case of non-coloring and the laser-absorbent,
the laser-transmissible molded workpiece made from the laser-transmissible composition including another dynamic crosslinking polyolefin thermoplastic elastomer that has the melting point ranging from 160 to 210 degrees Centigrade in case of non-coloring and dye salt exhibiting transmission of the laser having the wavelength of 800 to 1200 nm, and put onto the laser-absorptive molded workpiece,
wherein the workpieces are welded at the put position thereof by irradiated laser towards the laser-transmissible molded workpiece that transmits therethrough and is absorbed into the laser-absorptive molded workpiece.

The laser-transmissible composition of the present invention includes the colored dynamic crosslinking polyolefin thermoplastic elastomer having distinct hue by the dye salt. The laser-transmissible molded workpiece for laser welding is formed by using the composition through the heat treatment process such as the injection-molding. The laser-transmissible molded workpiece does not cause discoloring of the hue, has the sufficient laser-transmissible property under region of wavelength of near infrared rays and the excellent non-bleeding property of the dye salt toward the laser-absorptive molded workpiece that should be executed of the laser welding.

Moreover according to the method for laser welding, the both molded workpieces are executed of the laser welding by the efficient energy. And the welded pretty workpieces having the sufficient tensile strength and superior design without discoloring are obtained.

BRIEF EXPLANATION OF THE DRAWINGS

FIG. 3 is a perspective view of another embodiment in an operating condition that illustrates the laser welding of the laser-transmissible molded workpiece made from the laser-transmissible composition applying the present invention and the laser-absorptive molded workpiece.

DETAILED EXPLANATION OF THE INVENTION

Figure 1:
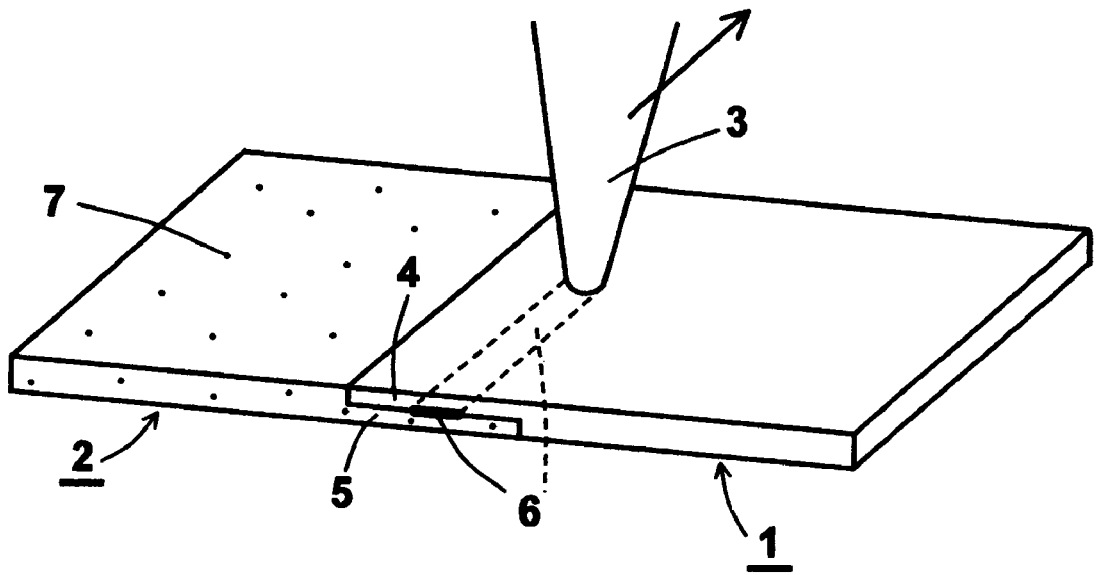
FIG. 1 is a perspective view of one embodiment in an operating condition that illustrates the laser welding of the laser-transmissible molded workpiece made from the laser-transmissible composition applying the present invention and the laser-absorptive molded workpiece.

Hereunder, the laser-transmissible composition, the laser-absorptive composition, the method for laser welding and the laser-welded article are explained in detail regarding the present invention.

The dynamic crosslinking polyolefin thermoplastic elastomer is available at lower manufacturing cost and has more favorable balance of the properties such as the tensile strength, the elongation at break and the tension set in comparison with one of the other thermoplastic elastomer. So the polyolefin thermoplastic elastomer is the optimum and significant material for molding.

The dynamic crosslinking polyolefin thermoplastic elastomer preferably includes a hard segment and a soft segment in the ratio ranging from 20:80 to 50:50 by the weight. For example, it is prepared by mixing thereof.

As the wavelength of the laser nears to the region of wavelength of infrared rays, the laser-transmissible property of the dynamic crosslinking polyolefin thermoplastic elastomer improves generally.

It is preferable that the transmittance of the dynamic crosslinking polyolefin thermoplastic elastomer under 840 nm of the wavelength of the laser is at least 35%. When the molded workpiece made from the laser-transmissible composition including thus elastomer having high transmittance is welded by the laser, it will be welded firmly by irradiating of the relatively weak laser. On this occasion, energy conversion efficiency of the laser is enough, and the laser is easy to control. So setting of the industrial condition is executed smoothly regardless of geometry of the molded workpiece. Further the pretty welded workpieces are formed at low manufacturing cost, and have usefully the sufficient tensile strength. The surface of the molded workpiece is difficult to cause burnout, irregularity and conspicuousness at the welded part.

Examples of the hard segment as the plastic component in the dynamic crosslinking polyolefin thermoplastic elastomer are the thermoplastic resin such as polypropylene and polyethylene illustrated with low-density polyethylene or polyethylene having straight chain or high-density polyethylene.

Examples of the soft segment as the rubber component in the dynamic crosslinking polyolefin thermoplastic elastomer are ethylene-propylene-diene-methylene copolymer (EPDM), ethylene-propylene copolymer (EPM), ethylene-butene rubber (EBM), acrylonitrile-butadiene copolymer rubber (NBR), acrylic rubber (ACM), ethylene-vinyl acetate copolymer (EVA), chlorinated polyethylene elastomer (CPE), epichlorohydrin rubber (ECO), natural rubber (NR), butyl rubber, ethylene-alpha-olefin copolymer elastomer (i.e. rubber) synthesized by a single-site catalyst such as metallocene catalyst, and other copolymer elastomer (i.e. rubber).

Especially the soft segment is preferably the ethylene-alpha-olefin copolymer elastomer above all. The ethylene-alpha-olefin copolymer elastomer is copolymer of ethylene and alpha-olefin having 3 to 20 carbon atoms more especially 6 to 12 carbon atoms, concretely.

Examples of the alpha-olefin having 3 to 20 carbon atoms are propylene, butene-1, pentene-1, hexene-1,4-methylpentene-1, heptene-1, octene-1, nonene-1, decene-1, undecene-1, dodecene-1. Especially hexene-1,4-methylpentene-1 and octene-1 are preferable. Octene-1 is further preferable, because it causes excellent effect of softening with only a little amount. Furthermore the copolymer including thereof has excellent mechanical strength.

The dynamic crosslinking polyolefin thermoplastic elastomers are classified into 3 types of a polymerizing type, a partial crosslinking type, a high density crosslinking type. The elastomers are changed to employ for suitable purposes, because the elastomers of all types have different physical properties such as elasticity.

Examples thereof are preferably the dynamic crosslinking polyolefin thermoplastic elastomer prepared under presence of the metallocene catalyst such as TPV A6110, TPV A9110, TPV A8120 and TPV B8130 that are available from Asahi Kasei Chemicals Corporation; the another dynamic crosslinking polyolefin thermoplastic elastomer made from polyethylene and ethylene-propylene-diene-methylene copolymer (EPDM) such as Soft Milastomer and Hard Milastomer that are available from Mitsui Chemicals Corporation.

Especially the polyolefin thermoplastic elastomer of the crosslinking type is preferably the ethylene-alpha-olefin copolymer elastomer prepared under presence of the single-site catalyst such as metallocene catalyst.

The metallocene catalyst is the high active single-site catalyst producing uniform active species. The catalyst is allowed to give suitable activity via precise molecular design of structure thereof. When the catalyst is used, the obtained copolymer from the alpha-olefin such as cyclic olefin and higher olefin is easier to carry out co-polymerization thereof than the case of using Ziegler-Natta catalyst. Furthermore it has narrower molecular weight distribution and more uniform distribution of the alpha-olefin as co-monomer having 3 to 20 carbon atoms therein. And it includes a smaller content of low molecular components. The crosslinking polyolefin thermoplastic elastomer prepared by using thereof causes uniform crosslinking and excellent rubber elasticity.

The ethylene-alpha-olefin copolymer elastomer as the high random copolymer prepared under presence of the metallocene catalyst has the sufficient transmissible property under region of wavelength of near infrared rays that is necessary for the laser welding. In the crosslinking polyolefin thermoplastic elastomer, thus ethylene-alpha-olefin copolymer elastomer as the main component is furthermore preferably included at least in 50% by weight.

The dynamic crosslinking polyolefin thermoplastic elastomer is prepared by mechanical mixing and vulcanization (i.e. crosslinking) reaction in a kneader machine such as a banbury mixer and a twin-screw kneader within a short time to form. The crosslinking reaction involves a process of crosslinking with only the soft segment and another process of crosslinking with both of the soft segment and the hard segment. Examples of crosslinking agent for the reaction are an organic peroxide, a phenol resin compound, a quinoid compound, a sulfur compound and a bismaleimide compound. The dynamic crosslinking polyolefin thermoplastic elastomer is prepared by the process. The dynamic crosslinking polyolefin thermoplastic elastomer is prepared preferably within 400 seconds of crosslinking time (Tc90) as index of the crosslinking reaction rate, further preferably within 300 seconds.

The dynamic crosslinking polyolefin thermoplastic elastomer is an elastomer alloy that crosslinked between the surfaces thereof through the crosslinking agent with a stable micro-phase separating state. The dynamic crosslinking polyolefin thermoplastic elastomer improves various properties such as the compressive strain and the heat resistance in comparison with the mere blending polyolefin thermoplastic elastomer as multi-components that is merely blended by the rubber component and the plastic component without the dynamic crosslinking. Therefore it is furthermore preferable for the laser welding. Moreover the dynamic crosslinking polyolefin thermoplastic elastomer improves dispersibility and coloring of the pigment or the dyestuff in the elastomer phase, in comparison with the polyolefin thermoplastic elastomer added with the pigment or the dyestuff without the dynamic crosslinking.

It is preferable that the dynamic crosslinking polyolefin thermoplastic elastomer is made from polypropylene or polyethylene and the ethylene-alpha-olefin copolymer elastomer. When the component ratio of ethylene and alpha-olefin in this ethylene-alpha-olefin copolymer elastomer is 55:45 to 80:20 by weight in the occasion, it has further excellent properties.

The dynamic crosslinking polyolefin thermoplastic elastomer is preferably the dynamic crosslinking polyolefin thermoplastic elastomer having the value of compressive strain ranging from 10 to 90%, further preferably from 20 to 70%, at 100 degrees Centigrade in accordance with Japanese Industrial Standard K-6262-1997. In the occasion of using thereof, the welded workpieces having high molding accuracy and sufficient adhesion are obtained.

The dynamic crosslinking polyolefin thermoplastic elastomer is preferably the dynamic crosslinking polyolefin thermoplastic elastomer having Shore hardness ranging from 30 to 90 (A), furthermore preferably from 60 to 90 (A), in accordance with Japanese Industrial Standard K-6253-1997.

The laser-transmissible composition may include only the dynamic crosslinking polyolefin thermoplastic elastomer as the thermoplastic elastomer, or may include additionally the other thermoplastic elastomer. The other thermoplastic elastomer consists of the thermoplastics component of the hard segment and the rubber component of the soft segment concretely. In the other thermoplastic elastomer, examples of the thermoplastics component are polystyrenes, poly(vinyl chlorides), polyesters, polyamides, polyurethanes, and examples of the rubber component are styrene-butadiene copolymer rubber (SBR), ethylene-propylene-diene-methylene copolymer (EPDM), acrylonitrile-butadiene copolymer rubber (NBR). They may be included with merely blending or dynamic crosslinking.

The laser-transmissible composition including the above-mentioned dynamic crosslinking polyolefin thermoplastic elastomer expresses the rubber elasticity just like vulcanized rubber at room temperature, and the plastic properties just like the thermoplastic resin that forms at will through plastic deformation with a injection-molding machine at high temperature. Therefore the composition is useful for the material of the molded workpiece that takes midway roles between the rubber and the plastic being thermoplastic. And the composition is used in extensive industrial fields. Especially the composition is used for molding of parts or frameworks in the fields of automobile industry, electric industry, electronic industry and so on.

The dye salt for the present invention has sufficient compatibility into the dynamic crosslinking polyolefin thermoplastic elastomer, and does not cause discoloring of the hue under the heat treatment process such as injection-molding and then laser welding. The molded workpiece colored by the dye salt causes the non-bleeding property, the high transmissible property under the single or plural wavelengths corresponding the laser ranging from 800 to 1200 nm. The colorant causes halochromism. Therefore ion group thereof expresses anchor effect in the laser-transmissible composition. Consequently it is assumed that the bleeding phenomenon is inhibited.

The above-mentioned dye salt comprises an anion base prepared from an acid dye and a cation base prepared from an organic amine. The dye salt is preferably the single or plural dye salt selected from group consisting of (a) a monoazo dye salt, (b) a disazo dye salt, (c) an anthraqunone dye salt, (d) an anthrapyridone dye salt and (e) a triphenylmethane dye salt. Every dye salt molecule has preferably one or two sulfo groups as the anion group of the anion base in the chemical structure thereof, for exhibition of the sufficient dispersibility of the dye salt into the dynamic crosslinking polyolefin thermoplastic elastomer.

The dye salt can be prepared by salt-forming reaction of the anion base derived from the acid dye and the cation base derived from the organic amine such as primary amines, secondary amines, tertiary amines, guanidines and rosin amines. The salt-forming reaction is executed by ionic reaction. For example, a procedure is as follows. The acid dye having two sulfo groups in its molecule is dispersed into the water to obtain the dispersoid. 1.5 to 2.5 molar equivalents of the organic amine that was dissolved by hydrochloric acid is added to the dispersoid. It is reacted with stirring for several hours. The reaction mixture is filtrated. The precipitate is washed with water and dried to obtain the dye salt.

Examples of the organic amine are aliphatic amines and aromatic amines. The concrete examples of the organic amine are an aliphatic amine such as butylamine, hexylamine, pentylamine, octylamine, laurylamine, myristylamine, palmitylamine, cetylamine, oleylamine, stearylamine, dibutylamine, 2-ethylhexylamine, di-(2-ethylhexyl)amine and dodecylamine; an alicyclic amine such as cyclohexylamine, di-cyclohexylamine and rosin amine; an alkoxylalkylamine such as 3-propoxypropylamine, 2-ethoxyhexylamine, di-(3-ethoxypropyl)amine, 3-butoxypropylamine, octyloxypropylamine and 3-(2-ethylhexyloxy)propylamine; an amine having an alkanol group such as N-cyclohexylethanolamine and N-dodecylimino-di-ethanol; a diamine such as dimethylaminopropylamine and dibutylaminopropylamine; an amine of a guanidine derivative such as 1,3-diphenylguanidine, 1-o-tolylguanidine and di-o-tolylguanidine; or an aromatic amine such as aniline, benzylamine, naphthylamine, phenylamine, phenylenediamine, methylphenylenediamine, xylenediamine and a N-monoalkyl-substituted product thereof. It is especially preferable that the organic amine is the alicyclic amine or the guanidine derivative.

(a) Explanation of the Monoazo Dye Salt

For example, the above-mentioned monoazo dye salt comprises an anion base prepared from a monoazo acid dye and a cation base prepared from the organic amine. The monoazo acid dye is preferably represented by the following chemical formula (1).

$$R^1\text{—}N\text{=}N\text{—}R^2 \tag{1}$$

[In the chemical formula (1), examples of $R^1$— and —$R^2$ are as follows.

$R^1$— is an aryl group being to have a substitutional group at the aromatic ring. Examples of this substitutional group are an alkyl group such as alkyl group having 1 to 8 carbons illustrated with methyl group, ethyl group, propyl group, isopropyl group, n-butyl group, tert-butyl group, n-pentyl group, isopentyl group, hexyl group, heptyl group or octyl group; an aryl group such as phenyl group and naphthyl group being to have a substituent such as an alkyl group having 1 to 4 carbons or a halogen group illustrated with chlorine or bromine; a hydroxyl group; a sulfo group; a carboxyl group; a halogen group such as chlorine and bromine; an alkoxyl group such as alkoxyl group having 1 to 8 carbons illustrated with methoxyl group, ethoxyl group or propoxyl group; an amino group; or an anilide group being to have a substituent such as an alkyl group having 1 to 4 carbons and a halogen group illustrated with chlorine or bromine.

—$R^2$ is an aryl group being to have a substitutional group at the aromatic ring. Examples of this substitutional group are an alkyl group such as alkyl group having 1 to 8 carbons illustrated with methyl group, ethyl group, propyl group, isopropyl group, n-butyl group, tert-butyl group, n-pentyl group, isopentyl group, hexyl group, heptyl group or octyl group; an aryl group such as phenyl group and naphthyl group being to have a substituent such as an alkyl group having 1 to 4 carbons and a halogen group illustrated with chlorine or bromine; a hydroxyl group; a sulfo group; a carboxyl group; a halogen group illustrated with chlorine or bromine; an alkoxyl group such as alkoxyl group having 1 to 8 carbons illustrated with methoxyl group, ethoxyl group or propoxyl group; an amino group; or an anilide group being to have a substituent such as an alkyl group having 1 to 4 carbons and a halogen group illustrated with chlorine or bromine.

Alternatively, —$R^2$ is a pyrazolone group having a substitutional group. Examples of this substitutional group are an alkyl group such as alkyl group having 1 to 8 carbons illustrated with methyl group, ethyl group, propyl group, isopropyl group, n-butyl group, tert-butyl group, n-pentyl group, isopentyl group, hexyl group, heptyl group or octyl group; an aryl group such as phenyl group and naphthyl group being to have a substituent such as an alkyl group having 1 to 4 carbons and a halogen group illustrated with chlorine or bromine; a hydroxyl group; a carboxyl group; a sulfo group; a halogen group such as chlorine and bromine; or an alkoxyl group such as alkoxyl group having 1 to 8 carbons illustrated with methoxyl group, ethoxyl group or propoxyl group.

At least one of $R^1$— -and —$R^2$ has a sulfo group as the substitutional group that means —$SO_3M$ whose M is a hydrogen atom, an alkaline metal or ammonium.]

That is to say, the monoazo acid dye represented by the chemical formula (1) has at least one sulfo group in the chemical structure thereof.

Examples of the monoazo acid dye that is represented by the above chemical formula (1) are the following Compound Examples. Certainly it is not to be construed to limit them in the present invention.

Compound Example No. 1-1

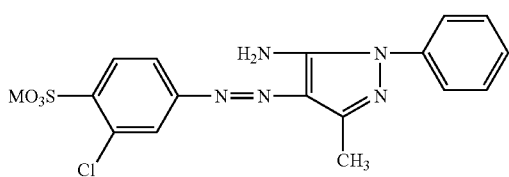

-continued

Compound Example No. 1-2

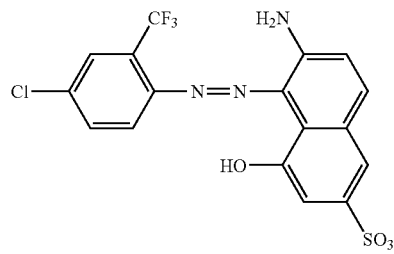

Compound Example No. 1-3

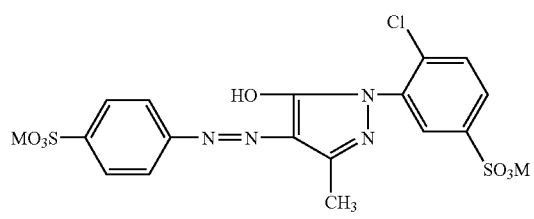

Compound Example No. 1-4

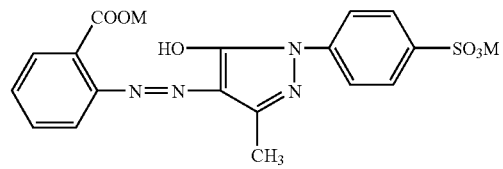

Compound Exampe No. 1-5

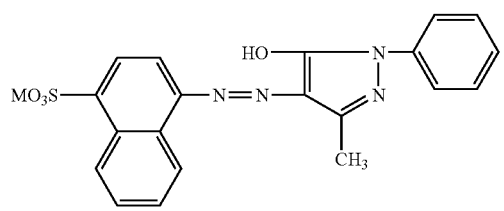

Compound Example No. 1-6

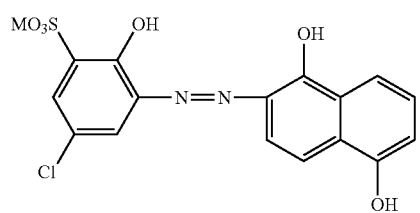

(b) Explanation of the Disazo Dye Salt

For example, the above-mentioned disazo dye salt comprises an anion base prepared from a disazo acid dye and a cation base prepared from the organic amine. The disazo acid dye is preferably represented by the following chemical formula (2).

$$R^3\text{—N}\!\!=\!\!\text{N-E-N}\!\!=\!\!\text{N—}R^4 \qquad (2)$$

[In the chemical formula (2), examples of $R^3$—, —$R^4$ and -E- are as follows.

$R^3$— and —$R^4$ are same or different, and one thereof is an aryl group being to have a substitutional group at the aromatic ring. Examples of this substitutional group are an alkyl group such as alkyl group having 1 to 8 carbons illustrated with methyl group, ethyl group, propyl group, isopropyl group, n-butyl group, tert-butyl group, n-pentyl group, isopentyl group, hexyl group, heptyl group or octyl group; an aryl group such as phenyl group and naphthyl group being to have a substituent such as an alkyl group having 1 to 4 carbons and a halogen group illustrated with chlorine or bromine; a hydroxyl group; a sulfo group; a carboxyl group; a halogen group such as chlorine and bromine; an alkoxyl group such as alkoxyl group having 1 to 8 carbons illustrated with methoxyl group, ethoxyl group or propoxyl group; an amino group; or an anilide group being to have a substituent such as an alkyl group having 1 to 4 carbons and a halogen group illustrated with chlorine or bromine.

Alternatively, one of $R^3$— and $R^4$— is a pyrazolone group being to have a substitutional group. Examples of this substitutional group are an alkyl group such as alkyl group having 1 to 8 carbons illustrated with methyl group, ethyl group, propyl group, isopropyl group, n-butyl group, tert-butyl group, n-pentyl group, isopentyl group, hexyl group, heptyl group or octyl group; an aryl group such as phenyl group and naphthyl group being to have a substituent such as an alkyl group having 1 to 4 carbons and a halogen group illustrated with chlorine or bromine; a hydroxyl group; a carboxyl group; a sulfo group; a halogen group such as chlorine and bromine; or an alkoxyl group such as alkoxyl group having 1 to 8 carbons illustrated with methoxyl group, ethoxyl group or propoxyl group.

-E- is represented by the following group of chemical formulae (3), (4) or (5).

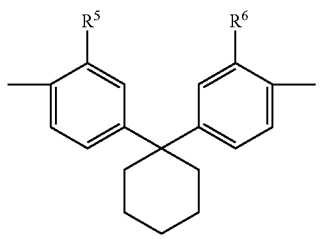

(3)

(In the group of the chemical formula (3), —$R^5$ and —$R^6$ are as follows.

—$R^5$ and —$R^6$ are same or different to each other, and one thereof is a hydrogen atom; an alkyl group being to have a substitutional group such as alkyl group having 1 to 8 carbons illustrated with methyl group, ethyl group, propyl group, isopropyl group, n-butyl group, tert-butyl group, n-pentyl group, hexyl group, heptyl group or octyl group; a halogen group such as chlorine and bromine; an alkoxyl group such as alkoxyl group having 1 to 8 carbons illustrated with methoxyl group, ethoxyl group or propoxyl group; or a sulfo group that means —$SO_3M$ whose M is same above.)

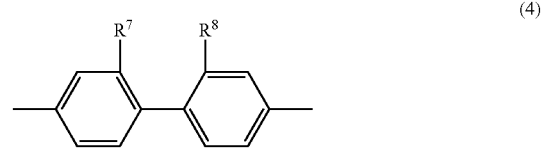

(4)

(In the group of the chemical formula (4), —$R^7$ and —$R^8$ are as follows.

—$R^7$ and —$R^8$ are independent respectively, and one thereof is a hydrogen atom or a sulfo group that means —$SO_3M$ whose M is same above.)

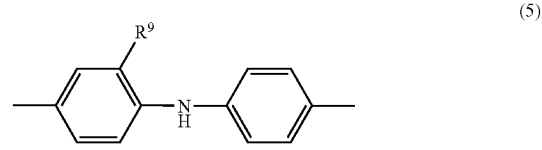

(5)

(In the group of the chemical formula (5), —$R^9$ is as follows.

—$R^9$ is a sulfo group that means —$SO_3M$ whose M is same above.)

At least one of -E-, —$R^3$ and —$R^4$ has a sulfo group as a substitutional group that means —$SO_3M$ whose M is same above.]

That is to say, the disazo acid dye represented by the chemical formula (2) has at least one sulfo group in the chemical structure thereof.

Concrete examples of the disazo acid dye represented by the above-mentioned chemical formula (2) are Compound Examples illustrated in Table 1. Certainly it is not to be construed to limit them in the present invention.

TABLE 1

| Compound Example | $R^3$— | —$R^4$ | —$R^5$ | —$R^6$ | —$R^7$ | —$R^8$ | —$R^9$ |
|---|---|---|---|---|---|---|---|
| 2-1 | ![OH naphthyl with SO3M] | ![HO naphthyl with MO3S and SO3M] | —H | —H | | | |

TABLE 1-continued

| Compound Example | R³— | —R⁴ | —R⁵ | —R⁶ | —R⁷ | —R⁸ | —R⁹ |
|---|---|---|---|---|---|---|---|
| 2-2 | (3-methyl-1,6-dihydroxynaphthalene-2-sulfonate) | (3-methyl-1,6-dihydroxynaphthalene-2-sulfonate) | —CH₃ | —CH₃ | | | |
| 2-3 | (1-phenyl-3-methyl-5-hydroxy-4-methylpyrazole) | (1-phenyl-3-methyl-5-hydroxy-4-methylpyrazole) | | | —SO₃M | —SO₃M | |
| 2-4 | (1-methyl-2-hydroxynaphthalene) | (1-methyl-2-hydroxynaphthalene) | | | —SO₃M | —SO₃M | |
| 2-5 | (3-phenylcarbamoyl-2-hydroxy-1-naphthyl) | (3-phenylcarbamoyl-2-hydroxy-1-naphthyl) | | | —SO₃M | —SO₃M | |
| 2-6 | (3-phenylcarbamoyl-2-hydroxy-1-naphthyl) | (3-phenylcarbamoyl-2-hydroxy-1-naphthyl) | | | | | —SO₃M |
| 2-7 | (1-methyl-6-t-butyl-2-hydroxynaphthalene) | (1-methyl-6-t-butyl-2-hydroxynaphthalene) | | | | | —SO₃M |

(c) Explanation of the Anthraqunone Dye Salt

For example, the above-mentioned anthraqunone dye salt comprises an anion base prepared from an anthraqunone acid dye and a cation base prepared from the organic amine. The anthraqunone acid dye is preferably represented by the following chemical formulae (6) or (7).

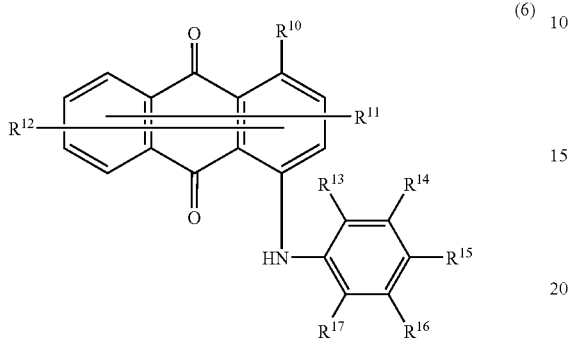

(6)

[In the chemical formula (6), examples of —$R^{10}$, —$R^{11}$, —$R^{12}$, —$R^{13}$, —$R^{14}$, —$R^{15}$, —$R^{16}$ and —$R^{17}$ are as follows.

—$R^{10}$ is a hydrogen atom; a hydroxyl group; an amino group being to have a substitutional group such as an alkyl group, a halogen group, an aryl group and a cycloalkyl group.

—$R^{11}$ and —$R^{12}$ are same or different to each other, and one thereof is a hydrogen atom; an alkyl group such as alkyl group having 1 to 12 carbons illustrated with methyl group, ethyl group, propyl group, isopropyl group, n-butyl group, tert-butyl group, n-pentyl group, isopentyl group, hexyl group, heptyl group or octyl group; a halogen group such as chlorine and bromine; an alkoxyl group such as alkoxyl group having 1 to 12 carbons illustrated with methoxyl group, ethoxyl group or propoxyl group; or a sulfo group that means —$SO_3M$ whose M is same above.

—$R^{13}$, —$R^{14}$, —$R^{15}$, —$R^{16}$ and —$R^{17}$ are same or different to each other, and one thereof is a hydrogen atom; an alkyl group such as alkyl group having 1 to 12 carbons illustrated with methyl group, ethyl group, propyl group, isopropyl group, n-butyl group, tert-butyl group, n-pentyl group, isopentyl group, hexyl group, heptyl group or octyl group; an acyl group; an acylamide group; an acyl-N-alkylamide group of which the alkyl is for example an alkyl group having 1 to 8 carbons such as methyl group, ethyl group, propyl group, isopropyl group, n-butyl group, tert-butyl group, n-pentyl group, isopentyl group, hexyl group, heptyl group and octyl group; a halogen group such as chlorine and bromine; an alkoxyl group such as alkoxyl group having 1 to 8 carbons illustrated with methoxyl group, ethoxyl group or propoxyl group; or a sulfo group that means —$SO_3M$ whose M is same above.

One of —$R^{10}$, —$R^{11}$, —$R^{12}$, —$R^{13}$, —$R^{14}$, —$R^{15}$, —$R^{16}$ and —$R^{17}$ is the sulfo group at least.]

That is to say, the anthraquinone acid dye represented by the chemical formula (6) has one sulfo group in the chemical structure thereof.

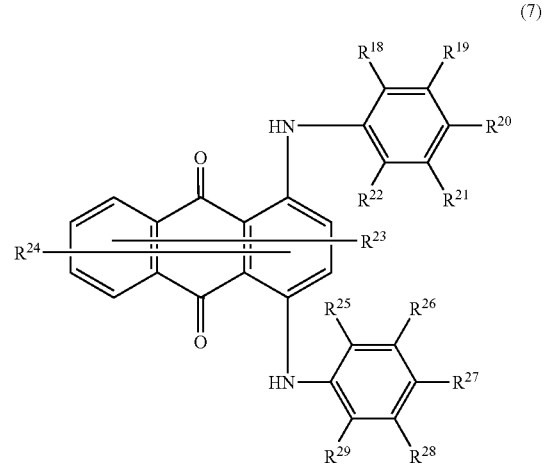

(7)

[In the chemical formula (7), examples of —$R^{18}$, —$R^{19}$, —$R^{20}$, —$R^{21}$, —$R^{22}$, —$R^{23}$, —$R^{24}$ —$R^{25}$, —$R^{26}$, —$R^{27}$, —$R^{28}$ and —$R^{29}$ are as follows.

—$R^{23}$ and —$R^{24}$ are same or different to each other, and one thereof is a hydrogen atom; an alkyl group such as alkyl group having 1 to 12 carbons illustrated with methyl group, ethyl group, propyl group, isopropyl group, n-butyl group, tert-butyl group, n-pentyl group, isopentyl group, hexyl group, heptyl group or octyl group; a halogen group such as chlorine and bromine; an alkoxyl group such as alkoxyl group having 1 to 12 carbons illustrated with methoxyl group, ethoxyl group or propoxyl group; an amino group; a nitro group; or a sulfo group that means —$SO_3M$ whose M is same above.

—$R^{18}$, —$R^{19}$, —$R^{20}$, —$R^{21}$, —$R^{22}$, —$R^{25}$, —$R^{26}$, —$R^{27}$, —$R^{28}$ and —$R^{29}$ are same or different to each other, and one thereof is a hydrogen atom; an alkyl group such as alkyl group having 1 to 12 carbons illustrated with methyl group, ethyl group, propyl group, isopropyl group, n-butyl group, tert-butyl group, n-pentyl group, isopentyl group, hexyl group, heptyl group or octyl group; an acyl group; an acylamide group; an acyl-N-alkylamide group of which the alkyl is for example an alkyl group having 1 to 8 carbons such as methyl group, ethyl group, propyl group, isopropyl group, n-butyl group, tert-butyl group, n-pentyl group, isopentyl group, hexyl group, heptyl group and octyl group; a halogen group such as chlorine and bromine; an alkoxyl group such as alkoxyl group having 1 to 8 carbons illustrated with methoxyl group, ethoxyl group or propoxyl group; or a sulfo group that means —$SO_3M$ whose M is same above.

One of —$R^{18}$, —$R^{19}$, —$R^{20}$, —$R^{21}$, —$R^{22}$, —$R^{23}$, —$R^{24}$, —$R^{25}$, —$R^{26}$, —$R^{27}$, —$R^{28}$ and —$R^{29}$ is the sulfo group at least.]

That is to say, the anthraquinone acid dye represented by the chemical formula (7) has one sulfo group in the chemical structure thereof.

Examples of the anthraquinone acid dye represented by the above chemical formula (6) or (7) are the following Compound Examples. Certainly it is not to be construed to limit them in the present invention.

Compound Example No. 3-1
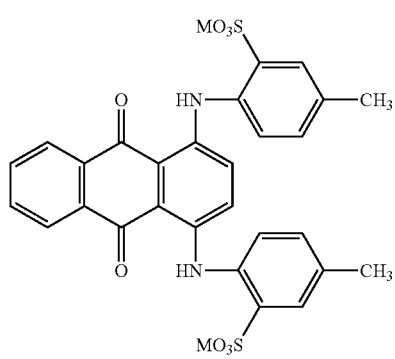

Compound Example No. 3-2
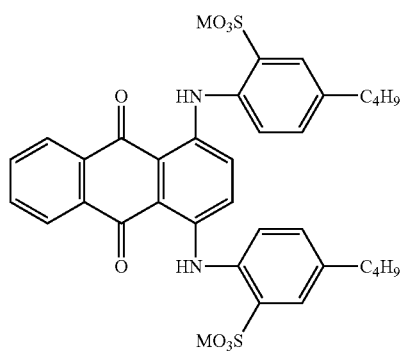

Compound Example No. 3-3
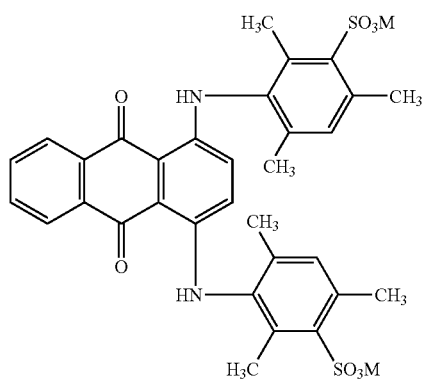

Compound Example No. 3-4
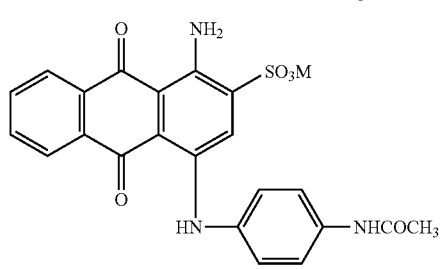

-continued

Compound Example No. 3-5
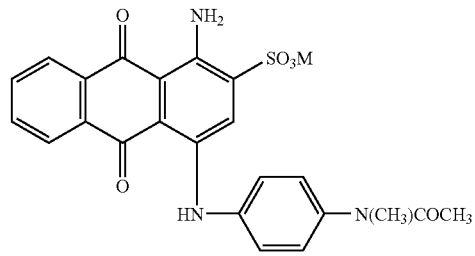

Compound Example No. 3-6
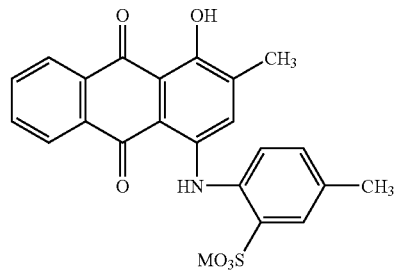

Compound Example No. 3-7
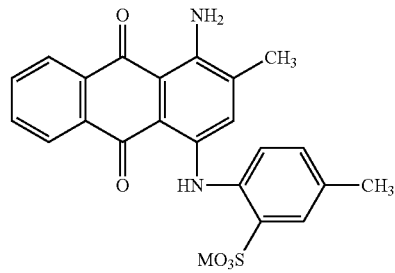

Compound Example No. 3-8
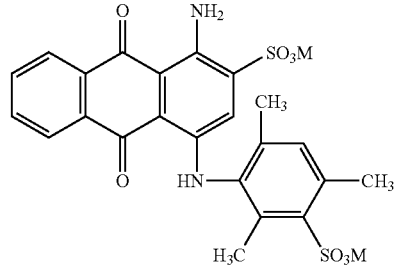

(d) Explanation of the Anthrapyridone Dye Salt

For example, the above-mentioned anthrapyridone dye salt comprises an anion base prepared from an anthrapyridone acid dye and a cation base prepared from the organic amine. The anthrapyridone acid dye is allowed to color the elastomer distinctly, and has the sufficient laser-transmissible property, the indispensable heat resistance on the occasion of molding of the laser-transmissible composition or then welding thereof, the practical and sufficient properties of the red dye especially the colorant for the laser welding. The anthrapyridone acid dye is preferably represented by the following chemical formula (8).

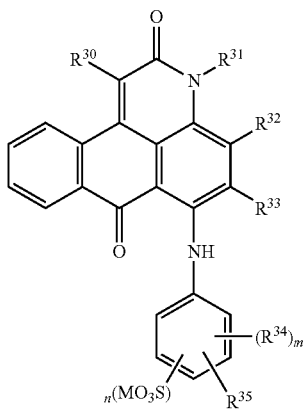

(8)

[In the chemical formula (8), examples of —$R^{30}$, —$R^{31}$, —$R^{32}$, —$R^{33}$, —$R^{34}$, —$R^{35}$, m and n are as follows.
- —$R^{30}$ is a hydrogen atom or a benzoyl group being to have a substitutional group at the benzene ring. Examples of this substitutional group are phenyl group being to have a substituent such as an alkyl group having 1 to 3 carbons illustrated with methyl group or ethyl group or propyl group, an alkoxyl group having 1 to 3 carbons illustrated with methoxyl group or ethoxyl group or propoxyl group, an hydroxyl group and a halogen group illustrated with chlorine or bromine or iodine or fluorine; an alkoxyl group having 1 to 3 carbons such as methoxyl group, ethoxyl group and propoxyl group; a hydroxyl group; or a halogen group such as chlorine, bromine, iodine and fluorine.
- $R^{31}$— is a hydrogen atom; an alkyl group such as alkyl group having 1 to 5 carbons illustrated with methyl group, ethyl group, propyl group, isopropyl group, n-butyl group or tert-butyl group; an aryl group being to have a substitutional group such as a lower alkyl group having 1 to 3 carbons and a halogen group illustrated with chlorine, bromine, iodine or fluorine at the aromatic ring, that is concretely phenyl group, naphthyl group, a lower alkyl-substituted phenyl group, a lower alkyl-substituted naphthyl group, a halogenated phenyl group or a halogenated naphthyl group; an alkoxyl group such as alkoxyl group having 1 to 18 carbons illustrated with methoxyl group, ethoxyl group, propoxyl group, butoxyl group, pentyloxy group or hexyloxy group; an amino group; a hydroxyl group; or a halogen group such as chlorine, bromine, iodine and fluorine.
- $R^{32}$— and $R^{33}$— are a hydrogen atom; an alkyl group such as alkyl group having 1 to 5 carbons illustrated with methyl group, ethyl group, propyl group, isopropyl group, n-butyl group or tert-butyl group; an aryl group being to have a substitutional group such as a lower alkyl group having 1 to 3 carbons and a halogen group illustrated with chlorine, bromine, iodine or fluorine at the aromatic ring, that is concretely phenyl group, naphthyl group, a lower alkyl-substituted phenyl group, a lower alkyl-substituted naphthyl group, a halogenated phenyl group or a halogenated naphthyl group; an alkenyl group such as alkenyl group having 2 to 18 carbons illustrated with vinyl group, allyl group, propenyl group or butenyl group; an alkoxyl group such as alkoxyl group having 1 to 18 carbons illustrated with methoxyl group, ethoxyl group, propoxyl group, butoxyl group, pentyloxy group or hexyloxy group; an amino group; a hydroxyl group; a halogen group such as chlorine, bromine, iodine and fluorine; an acyl group such as formyl group, acetyl group, propionyl group, butyryl group, valeryl group, benzoyl group and toluoyl group; an acyloxy group such as —O-acetyl group, —O-propionyl group, —O-benzoyl group and —O-toluoyl group; an acylamide group such as formylamide group and acetylamide group; a sulfo group; an acyl-N-alkylamide group; a carboxyl group; an alkoxylcarbonyl group such as methoxycarbonyl group, ethoxycarbonyl group, propoxycarbonyl group and butoxycarbonyl group; or cyclohexylamide group.

Alternatively $R^{32}$— and $R^{33}$— are a group represented by the following chemical formula (9).

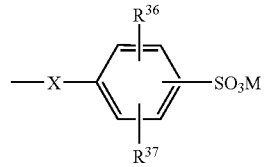

(9)

(In the group of the chemical formula (9), examples of —X—, $R^{36}$—, $R^{37}$— and M are as follows.
- —X— is —O— or —NH—.
- $R^{36}$— and $R^{37}$— are same or different to each other, and one thereof is a hydrogen atom; an alkyl group such as alkyl group having 1 to 5 carbons illustrated with methyl group, ethyl group, propyl group, isopropyl group, n-butyl group or tert-butyl group; an aryl group being to have a substitutional group such as a lower alkyl group having 1 to 3 carbons and a halogen group illustrated with chlorine, bromine, iodine or fluorine at the aromatic ring, that is concretely phenyl group, naphthyl group, a lower alkyl-substituted phenyl group, a lower alkyl-substituted naphthyl group, a halogenated phenyl group or a halogenated naphthyl group; an alkenyl group such as an alkenyl group having 2 to 18 carbons illustrated with vinyl group, allyl group, propenyl group or butenyl group; an alkoxyl group such as alkoxyl group having 1 to 18 carbons illustrated with methoxyl group, ethoxyl group, propoxyl group, butoxyl group, pentyloxy group or hexyloxy group; an amino group; a hydroxyl group; a halogen group such as chlorine, bromine, iodine and fluorine; an acyl group such as formyl group, acetyl group, propionyl group, butyryl group, valeryl group, benzoyl group and toluoyl group; an acyloxy group such as —O-acetyl group, —O-propionyl group, —O-benzoyl group and —O-toluoyl group; an acylamide group such as formylamide group and acetylamide group; an acyl-N-alkylamide group; a carboxyl group; an alkoxylcarbonyl group such as methoxycarbonyl group, ethoxycarbonyl group, propoxycarbonyl group and butoxycarbonyl group; or cyclohexylamide group.

M is a hydrogen atom, an alkaline metal or an ammonium.)

$R^{34}$— is a hydrogen atom; an alkyl group such as alkyl group having 1 to 5 carbons illustrated with methyl group, ethyl group, propyl group, isopropyl group, n-butyl group or tert-butyl group; an alkoxyl group such as alkoxyl group having 1 to 18 carbons illustrated with methoxyl group, ethoxyl group, propoxyl group, butoxyl group, pentyloxy group or hexyloxy group; or a hydroxyl group.

$R^{35}$— is a hydrogen atom; an alkyl group such as alkyl group having 1 to 5 carbons illustrated with methyl group, ethyl group, propyl group, isopropyl group, n-butyl group or tert-butyl group; an alkoxyl group such as alkoxyl group having 1 to 18 carbons illustrated with methoxyl group, ethoxyl group, propoxyl group, butoxyl group, pentyloxy group or hexyloxy group; or a hydroxyl group.

M is a hydrogen atom, an alkaline metal or an ammonium.

m is 1, 2 or 3.

n is 1, 2 or 3.

When —$R^{34}$ of the anthrapyridone acid dye are plural, each of —$R^{34}$ is same or different respectively. When all sulfo groups, that means —$SO_3M$ whose M is same above, including furthermore one of the chemical formula (9) are plural, each of M are same or different respectively.]

Examples of the anthrapyridone acid dye represented by the above chemical formula (8) are the following Compound Examples. Certainly it is not to be construed to limit them in the present invention.

Compound Example No. 4-1

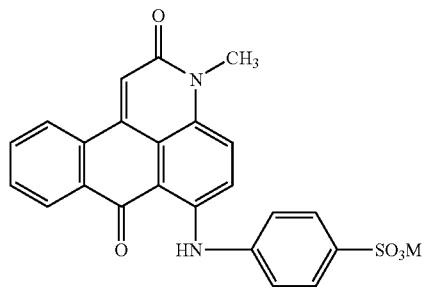

Compound Example No. 4-2

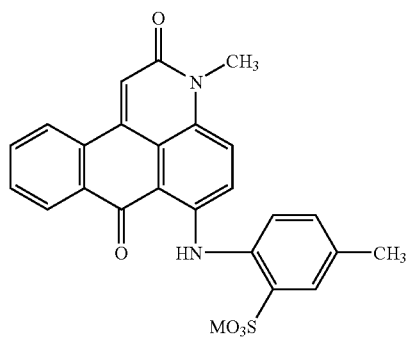

Compound Example No. 4-3

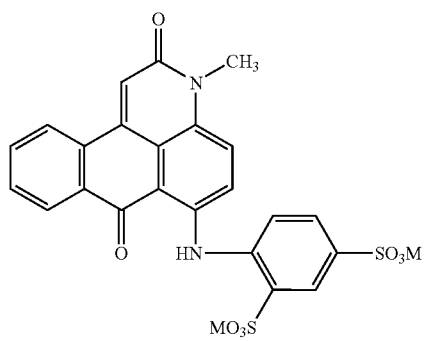

Compound Example No. 4-4

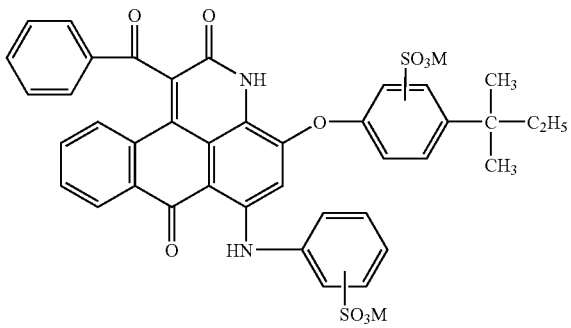

Compound Example No. 4-5

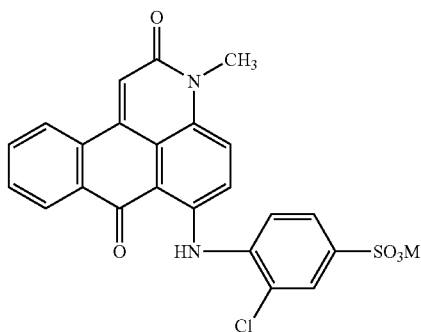

Compound Example No. 4-6

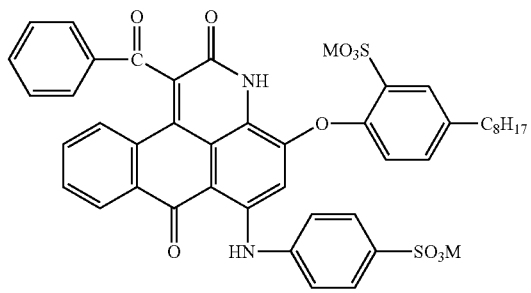

(e) Explanation of the Triphenylmethane Dye Salt

For example, the above-mentioned the triphenylmethane dye salt comprises an anion base prepared from a triphenylmethane acid dye and a cation base prepared from the organic amine. The triphenylmethane acid dye is preferably represented by the following chemical formula (10).

(10)

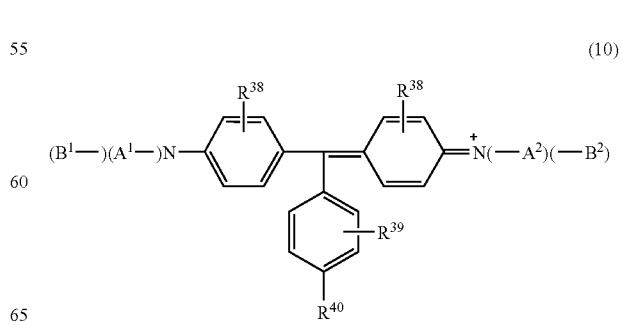

[In the chemical formula (10), examples of —$R^{38}$, —$R^{39}$, —$R^{40}$, $A^1$—, —$A^2$, $B^1$— and —$B^2$ are as follows.

—$R^{38}$ is a hydrogen atom; or an alkyl group such as alkyl group having 1 to 8 carbons illustrated with methyl group, ethyl group, propyl group, isopropyl group, n-butyl group, tert-butyl group, n-pentyl group, isopentyl group, hexyl group, heptyl group or octyl group.

—$R^{39}$ is a hydrogen atom; an alkyl group such as alkyl group having 1 to 8 carbons illustrated with methyl group, ethyl group, propyl group, isopropyl group, n-butyl group, tert-butyl group, n-pentyl group, isopentyl group, hexyl group, heptyl group or octyl group; a hydroxyl group; a carboxyl group; or a sulfo group.

—$R^{40}$ is a hydrogen atom; a sulfo group; an aryl group such as phenyl group, tolyl group and naphthyl group being to have a substitutional group at the aromatic ring. Examples of this substitutional group are a sulfo group; a hydroxyl group; a nitro group; an amino group; a halogen group such as chlorine and bromine; a carboxyl group; an alkoxyl group such as alkoxyl group having 1 to 8 carbons illustrated with methoxyl group, ethoxyl group or propoxyl group; or an alkyl group such as alkyl group having 1 to 8 carbons illustrated with methyl group, ethyl group, propyl group, isopropyl group, n-butyl group, tert-butyl group, n-pentyl group, isopentyl group, hexyl group, heptyl group or octyl group.

Alternatively —$R^{40}$ is a group represented by the following chemical formula (11)

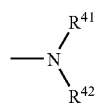

(11)

(In the chemical formula (11), examples of —$R^{41}$ and —$R^{42}$ are as follows.

—$R^{41}$ and —$R^{42}$ are same or different to each other. And one of them is a hydrogen atom. One of them may be an alkyl group such as methyl group, ethyl group, propyl group, isopropyl group, n-butyl group, tert-butyl group, n-pentyl group, isopentyl group, hexyl group, heptyl group and octyl group being to have a substitutional group, and examples of this substitutional group are a sulfo group; a hydroxyl group; a nitro group; an amino group, a halogen group such as chlorine and bromine; a carboxyl group; an alkoxyl group such as alkoxyl group having 1 to 8 carbons illustrated with methoxyl group, ethoxyl group or propoxyl group. One of them may be an aryl group such as phenyl group, tolyl group and naphthyl group being to have a substitutional group, and examples of this substitutional group are a sulfo group; a hydroxyl group; a nitro group; an amino group; a halogen group such as chlorine and bromine; a carboxyl group; an alkoxyl group such as alkoxyl group having 1 to 8 carbons illustrated with methoxyl group, ethoxyl group or propoxyl group; an alkyl group such as alkyl group having 1 to 8 carbons illustrated with methyl group, ethyl group, propyl group, isopropyl group, n-butyl group or tert-butyl group. One of them may be an aralkyl group being to have a substitutional group such as benzyl group, alpha-methylbenzyl group, alpha,alpha-dimethylbenzyl group, alpha-butylbenzyl group, phenethyl group, naphthylalkyl group illustrated with naphthylmethyl group or naphthylethyl group, and examples of this substitutional group are a sulfo group; a hydroxyl group; a nitro group; an amino group; a halogen group such as chlorine and bromine; a carboxyl group; an alkoxyl group such as alkoxyl group having 1 to 8 carbons illustrated with methoxyl group, ethoxyl group or propoxyl group; or an alkyl group such as alkyl group having 1 to 8 carbons illustrated with methyl group, ethyl group, propyl group, isopropyl group, n-butyl group, tert-butyl group, n-pentyl group, isopentyl group, hexyl group, heptyl group or octyl group.)

$A^1$- and —$A^2$ are same or different to each other, and one thereof is a hydrogen atom; or an alkyl group such as alkyl group having 1 to 8 carbons illustrated with methyl group, ethyl group, propyl group, isopropyl group, n-butyl group, tert-butyl group, n-pentyl group, isopentyl group, hexyl group, heptyl group or octyl group being to have a substitutional group. Examples of this substitutional group are a hydroxyl group and a halogen group such as chlorine and bromine.

$B^1$— and —$B^2$ are same or different to each other. And one of them is an aryl group such as phenyl group, tolyl group and naphthyl group being to have a substitutional group, and examples of this substitutional group are a sulfo group; a hydroxyl group; a nitro group; an amino group; a halogen group such as chlorine and bromine; a carboxyl group; an alkoxyl group such as alkoxyl group having 1 to 8 carbons illustrated with methoxyl group, ethoxyl group or propoxyl group; an alkyl group such as alkyl group having 1 to 8 carbons illustrated with methyl group, ethyl group, propyl group, isopropyl group, n-butyl group, tert-butyl group, n-pentyl group, isopentyl group, hexyl group, heptyl group or octyl group. One of them may be an aralkyl group being to have a substitutional group such as benzyl group, alpha-methylbenzyl group, alpha,alpha-dimethylbenzyl group, alpha-butylbenzyl group, phenethyl group, naphthylalkyl group illustrated with naphthylmethyl group and naphthylethyl group, and examples of this substitutional group are a sulfo group; a hydroxyl group; a nitro group; an amino group; a halogen group such as chlorine and bromine; a carboxyl group; an alkoxyl group such as alkoxyl group having 1 to 8 carbons illustrated with methoxyl group, ethoxyl group, propoxyl group or butoxyl group; or an alkyl group such as alkyl group having 1 to 8 carbons illustrated with methyl group, ethyl group, propyl group, isopropyl group, n-butyl group, tert-butyl group, n-pentyl group, isopentyl group, hexyl group, heptyl group or octyl group.

One or more of —$R^{38}$, —$R^{40}$, $B^1$— and —$B^2$ has the sulfo group illustrated by —$SO_3M$ that M is same above.]

Examples of the triphenylmethane acid dye represented by the above chemical formula (10) are the following Compound Examples. Certainly it is not to be construed to limit them in the present invention.

TABLE 2

| Compound Example | —R³⁸ | —R³⁹ | —R⁴⁰ | A¹— | —A² | B¹— | —B² |
|---|---|---|---|---|---|---|---|
| 5-1 | —CH₃ | —H | -NH-C₆H₄-OC₂H₅ | C₂H₅— | —C₂H₅ | MO₃S-C₆H₄-CH₂— | —CH₂-C₆H₄-SO₃M |
| 5-2 | —CH₃ | —H | -NH-C₆H₄-OC₂H₅ | C₄H₉— | —C₄H₉ | MO₃S-C₆H₄-CH₂— | —CH₂-C₆H₄-SO₃M |
| 5-3 | —H | —H | -NH-C₆H₄-OC₂H₅ | C₂H₅— | —C₂H₅ | MO₃S-C₆H₄-CH₂— | —CH₂-C₆H₄-SO₃M |
| 5-4 | —H | —H | -NH-C₆H₅ | H— | —H | MO₃S-C₆H₄— | —C₆H₄-SO₃M |
| 5-5 | —H | —CH₃ | —NH₂ | H— | —H | C₆H₅— | —C₆H₄-SO₃M |
| 5-6 | —H | —H | —SO₃M | C₂H₅— | —C₂H₅ | MO₃S-C₆H₄-CH₂— | —CH₂-C₆H₄-SO₃M |
| 5-7 | —H | —H | -NH-C₆H₄-OC₂H₅ | C₂H₅— | —C₂H₅ | MO₃S-C₆H₄— | —C₆H₄-SO₃M |
| 5-8 | —CH₃ | —H | —N(C₂H₅)₂ | C₄H₉— | —C₄H₉ | MO₃S-C₆H₄— | —C₆H₄-SO₃M |

The dyestuffs give the hue, whose maximum absorption wavelength ranges from 400 to 700 nm, such as yellow, orange, red, brown, green, blue, violet, gray and black. The dye salt included in the laser-transmissible composition has only an absorption range except for a visible radiation absorption region of the dyestuff, or additionally the absorption region. The single or plural dyestuff having transmissible property of the laser wavelength region of wavelength ranging from 800 to 1200 nm may be used with mixing. As the colorant, the other additional dyestuff colorant having the identical and sufficient laser transmissible property that gives the hue such as yellow, orange, red, brown, green, blue and violet may be mixed properly to the dye salt.

For example, the mixed colorant giving the hue of black are blended by combining the blue or green dyestuff colorant with the red dyestuff colorant and yellow dyestuff colorant additionally to prepare. The laser-transmissible composition having the hue of gray or black is significant for the industrial application thereof.

For examples, the blended colorant are prepared by the combining in the blue or green or violet dyestuff such as an anthraqunone dyestuff and a triphenylmethane dyestuff with the yellow such as a monoazo dyestuff and/or red colorant such as a disazo dyestuff and an anthrapyridone dyestuff. Consequently the blended colorant has the hue of green such as combination of blue and yellow; the hue of violet such as combination of blue and red; or the hue of black such as combination of blue and red and yellow, combination of violet and yellow or combination of green and red.

Furthermore the colorant may include the known single or plural dyestuff or pigment without deviation of the desired effect of the present invention. Examples of the known dyestuff or pigment are organic dyestuff or pigment such as azo dyestuff or pigment, metallized azo dyestuff or pigment, naphtholazo dyestuff or pigment, azolake dyestuff or pigment, azomethine dyestuff or pigment, anthraquinone dyestuff or pigment, quinacridone dyestuff or pigment, dioxazine dyestuff or pigment, diketopyrrolopyrrole dyestuff or pigment, anthrapyridone dyestuff or pigment, isoindolinone dyestuff or pigment, indanthrone dyestuff or pigment, perinone dyestuff or pigment, perylene dyestuff or pigment, indigo dyestuff or pigment, thioindigo dyestuff or pigment, quinophthalone dyestuff or pigment, quinoline dyestuff or pigment, benzimidazolone dyestuff or pigment and triphenylmethane dyestuff or pigment.

The content of the colorant in the laser-transmissible composition is preferably ranging from 0.01 to 10% by weight towards the dynamic crosslinking polyolefin thermoplastic elastomer. It is further preferably ranging from 0.05 to 5% by weight, furthermore preferably ranging from 0.05 to 2% by weight.

The laser-transmittance at 840 nm of the wavelength in the colored laser-transmissible composition including the colorant is represented by $T_1$. The laser-transmittance at 840 nm of the wavelength in the non-colored similar laser-transmissible composition except for including no colorant is represented by $T_2$. The ratio (i.e. $T_1/T_2$) is more than 0.5, preferably ranging from 0.7 to 1.0, further preferably ranging from 0.8 to 1.0.

Then the laser-absorptive molded workpiece 2 is explained. The laser-absorptive molded workpiece are preferably made from the laser-absorptive composition including the above-mentioned thermoplastic elastomer or the thermoplastic resin colored by the laser-absorbent simultaneously with the black colorant such as carbon black. Preferably the carbon black has primary particle size ranging from 18 to 30 nm. Using thus carbon black, the carbon black is dispersed very homogeneously. Consequently the laser-absorptive molded workpiece that absorbs the laser with high absorptivity is obtained. Nigrosine dyestuff may be used with the carbon black to control the laser-absorptivity properly.

Examples of the above-mentioned thermoplastic resin are polyamide resin; polyethylene resin; polypropylene resin; polystyrene resin; polymethacryl resin; poryacrylamide resin; ethylene-vinyl alcohol (EVOH) resin; polyester resin such as polycarbonate resin, polyethylene terephthalate (PET) resin, polybutylene terephthalate resin (PBT). The resins may be used singly or plurally.

The other example is the thermoplastic resin that the polypropylene resin may include the talc as the filler. When the thermoplastic resin includes talc, it is furthermore preferable because the mechanical strength and the stability of the geometry are improved.

The laser-absorptive composition including the thermoplastic elastomer (i.e. rubber) or the thermoplastic resin may have no carbon black. The other colorant and the other laser-absorbent such as nigrosine, aniline black, phthalocyanine, naphthalocyanine, perylene, quaterrylene, metal complex, square acid, immonium dyestuff, polymethin and so on may be used instead of using the carbon black. Alternatively the other colorant simultaneously with the laser-absorbent may be used instead of using the carbon black. Using the laser-absorptive composition, the laser-absorptive molded workpiece having the hue of chromatic color such as yellow, orange, red, brown, green, blue and violet is obtained.

The dynamic crosslinking polyolefin thermoplastic elastomer in the laser-absorptive composition has the melting point ranging from 160 to 210 degrees Centigrade in case of non-coloring. When the melting point thereof is within this range, the dynamic crosslinking polyolefin thermoplastic elastomer has excellent dispersibility and obstruction of deteriorating the colorant. The laser-absorptive composition including the elastomer causes the glossy and excellent surface and appearance thereof.

Measuring the melting point thereof is carried out by the same as the above-mentioned method for measuring the melting point of the elastomer for the laser-transmissible composition.

The content of the colorant in the laser-absorptive composition is for example ranging from 0.01 to 10% by weight, preferably ranging from 0.05 to 5% by weight towards the dynamic crosslinking polyolefin thermoplastic elastomer or the thermoplastic resin. The laser-absorptive molded workpiece may be formed by the similar procedure of the laser-transmissible molded workpiece except for including the laser-absorbent.

Especially, the black molded workpieces take a significant role industrially. The selection of kinds of material of the thermoplastic elastomer having high transparency, the selection of kinds of the colorant having sufficient dispersion into the thermoplastic elastomer of the material, the setting of proper condition of kneading are significant to color distinctly. The thermoplastic elastomer having 1.5 or more of optical density (i.e. OD value) under 0.1% of the additive content thereof by weight towards the thermoplastic elastomer is selected to be the excellent black material.

The dynamic crosslinking polyolefin thermoplastic elastomer causes sufficient dispersion of the pigment especially the carbon black. So the uniform energy-absorptivity of the laser is expressed, and the laser welding without irregularity is accomplished. Further the elastomer has higher transparency. The elastomer that is blended with the black dyestuff or pigment is hard to look gray. The elastomer that is blended with even at a little additive content thereof is colored with black distinctly. Consequently, the elastomer is optimum for the laser-absorptive material moreover. It is preferable that the dynamic crosslinking polyolefin thermoplastic elastomer is ethylene-alpha-olefin copolymer elastomer.

The composition for forming the laser-transmissible molded workpiece or the laser-absorptive molded workpiece of the present invention may properly include various reinforcement or filler according as a use or a purpose. The reinforcement or the filler may be used for reinforcing the synthetic resin generally, and is not to be limit to fiber, plate, powder or grains in shape. The proper filler is used if necessary.

Examples of the filler are plate-shaped filler such as mica, sericite and glass flakes; silicate such as talc, kaolin, clay, wollastonite, bentonite, asbestos and alumina silicate; metal oxide such as alumina, silicon oxide, magnesium oxide, zirconia and titanium oxide; carbonate such as calcium carbonate, magnesium carbonate and dolomite; sulfate such as calcium sulfate and barium sulfate; and granular filler such as glass beads, ceramic beads, boron nitride and silicon carbide. The content of the filler preferably ranges from 5 to 50% by weight. The fibrous reinforcement and the filler may be used plurally. Further the fibrous reinforcement and the filler is preferably used to treat with a surface treatment agent such as a coupling agent illustrated with silanes, epoxides or titanates, because of causing more sufficient mechanical strength. When the talc is employed, it is furthermore preferable because the mechanical strength and the stability of the geometry are improved.

Examples of the additive fibrous reinforcement are a glass fiber, a carbon fiber or the other inorganic fiber; an organic fiber such as aramid, polyphenylene sulfide, nylon, polyester and liquid crystal polymer; and fibrous potassium titanate whisker, fibrous barium titanate whisker, fibrous aluminum borate whisker, fibrous silicon nitride whisker. The content thereof preferably ranges from 5 to 120% by weight towards 100% of the dynamic crosslinking thermoplastic elastomer or the thermoplastic resin by weight. If it is less than 5% by weight, it is hard to causes sufficient effect for reinforcing by the glass fiber. If it is more than 120% by weight, it tends to decrease the molding property. It is further preferably ranging from 10 to 60% by weight, furthermore preferably ranging from 20 to 50% by weight.

The composition for forming the laser-transmissible molded workpiece or the laser-absorptive molded workpiece of the present invention may be blended with various additive agent if necessary. Examples of the additive agent are an auxiliary such as a titanium oxide and zinc oxide; an dispersant; a stabilizer; a plasticizer; a modifier; an ultraviolet absorbent; a light-stabilizer; an oxidant inhibitor such as phenols and phosphorus compounds; an antistatic agent; a lubricant; a mold lubricant; a crystalline accelerator; a crystalline germ such as metal phosphates, metal carbonates and benzylidene-sorbitols; and a flame retarder.

A masterbatch made from the composition for forming the laser-transmissible molded workpiece or the laser-absorptive molded workpiece is prepared by an optional method such as following method. The colorant and pellets of the dynamic crosslinking polyolefin thermoplastic elastomer as base of the masterbatch are mixed with a blender such as a tumbler and a super-mixer. Then it is heated and kneaded with an extruder, a batch kneader or a roll kneader to obtain pellets or rough grains of masterbatch.

The molding of the composition for forming of the laser-transmissible molded workpiece or the laser-absorptive molded workpiece is executed by general procedures. For example, the molding procedure is executed by using the colored pellets with a molding machine such as an extruding machine, an injection molding machine and a roll mill. Further the molding procedures is executed by mixing of pellets of the translucent thermoplastic elastomer, the pulverized colorant and the additive agents if necessary with a proper mixer to prepare a mixture, and molding the mixture with a molding machine. Any general molding procedure may be executed. Examples of the molding procedure are injection molding, extrusion molding, compression molding, foaming, blow molding, vacuum molding, injection blow molding, rotational molding, calendar molding, solution casting. The molded workpieces having various shapes made from the thermoplastic elastomer or the thermoplastic resin obtained by thus molding procedures.

The method for the laser welding using the laser-transmissible composition of the present invention is explained. Hereunder, an embodiment of the method for the laser welding is explained with referring FIG. 1 that illustrates the embodiment on the way.

As shown in FIG. 1, a stair 4 of edge of the laser-transmissible molded workpiece 1 made from the laser-transmissible composition and a stair 5 of edge of the laser-absorptive molded workpiece 2 are put together. Laser 3 is irradiated from a side of the laser-transmissible molded workpiece 1 towards a side of the laser-absorptive workpiece 2. The laser 3 transmitted through the laser-transmissible molded workpiece 1, is absorbed into the laser-absorptive molded workpiece 2 and causes the exothermic. The laser-absorptive molded workpiece 2 at a laser-absorbing neighborhood is melted by the exothermic. Then it melts the laser-transmissible molded workpiece 1, to weld both workpieces at melting position 6. After cooling, the laser-transmissible molded workpiece 1 and the laser-absorptive molded workpiece 2 are firmly joined with sufficient welding strength.

Further preferably, the concrete embodiments of the method for the laser welding of the present invention are as follows.

The first embodiment of the method is shown in FIG. 1. The laser-transmissible molded workpiece 1 made from the laser-transmissible composition including a dynamic crosslinking polyolefin thermoplastic elastomer A and the dye salt, and the laser-absorptive molded workpiece 2 made from the laser-absorptive composition including a dynamic crosslinking polyolefin thermoplastic elastomer B and the laser-absorbent 7 are put together. Laser is irradiated from a side of the laser-transmissible molded workpiece 1 to execute the laser welding. In this embodiment, the dynamic crosslinking polyolefin thermoplastic elastomer A has preferably 35% or more transmittance.

Incidentally, the method for the laser welding may be executed by the laser welding of the laser-transmissible molded workpiece 1 and the laser-absorptive molded workpiece 2 formed by the thermoplastic resin made from the composition including the laser-absorbent and the polypropylene resin.

Figure 2:
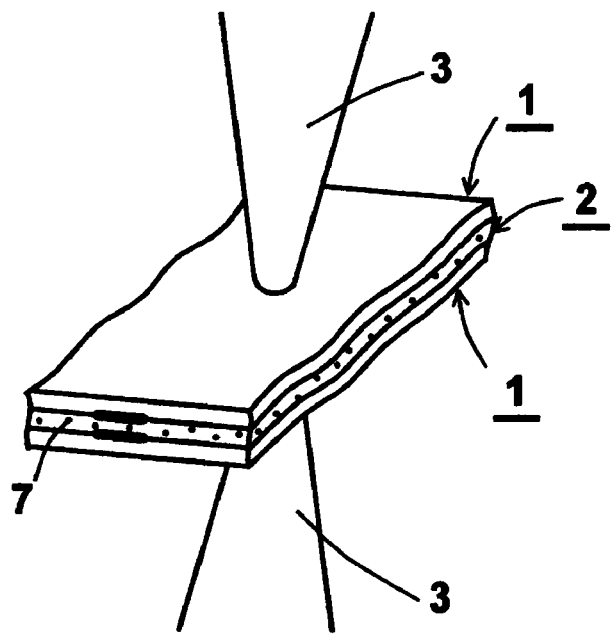
FIG. 2 is a perspective view of another embodiment in an operating condition that illustrates the laser welding of the laser-transmissible molded workpiece made from the laser-transmissible composition applying the present invention and the laser-absorptive molded workpiece.

The second embodiment of the method is shown in FIG. 2. One laser-absorptive molded workpiece 2 as the same workpiece in the first embodiment is sandwiched between two laser-transmissible molded workpieces 1 as the same workpiece in the first embodiment to put together. Laser 3 is irradiated from both exposure sides of the laser-transmissible molded workpieces 1 to execute the laser welding.

Incidentally, either of two laser-transmissible molded workpieces 1 may be turned into the workpiece made from the laser-transmissible thermoplastic resin being to be colored. Moreover the laser-absorptive molded workpiece 2 may be turned into the workpiece made from the above-mentioned laser-absorptive thermoplastic resin.

The third embodiment of the method is explained as referring FIG. 2. One extra-thin laser-absorptive molded workpiece 2 as the similar workpiece in the first embodiment is sandwiched between two laser-transmissible molded workpieces 1 as the same workpiece in the first embodiment to put together. Laser 3 is irradiated from only either side of the laser-transmissible molded workpieces 1 to execute the laser welding, for example the above side in FIG. 2. The laser 3 is absorbed into the extra-thin laser-absorptive molded workpiece 2 and causes the exothermic to execute the laser welding of two laser-transmissible molded workpieces 1 and the laser-absorptive molded workpiece 2.

Incidentally, either of two laser-transmissible molded workpieces 1 may be turned into the workpiece, that may be colored, made from the laser-transmissible thermoplastic resin, the laser-absorptive thermoplastic elastomer or the laser-absorptive thermoplastic resin. Moreover the laser-absorptive molded workpiece 2 may be turned into the workpiece made from the above-mentioned laser-absorptive thermoplastic resin.

The fourth embodiment of the method is shown in FIG. 3. Either of two laser-transmissible molded workpieces as the same workpiece in the first embodiment is coated with ink or paint including the laser-absorbent 7 to obtain the laser-absorptive molded workpiece 2 having a layer 8 including the laser-absorbent. Thereto, another laser-transmissible molded workpiece 1 is put together. Laser 3 is irradiated from both sides thereof to execute the laser welding.

Incidentally, the laser-absorptive molded workpiece 2 having the layer 8 including the laser-absorbent may be turned into the workpiece that is to have a colored layer 8 including the laser-absorbent and is made from the laser-transmissible thermoplastic resin. For example, the layer 8 including the laser-absorbent is prepared by coating with ink and/or paint including the laser-absorbent and the resin if necessary. Coating thereof is executed by optional procedure such as spraying and painting with a marking-pen, a painting brush or a writing brush. The coated layer 8 preferably has thickness ranging 0.1 mm or less thereby.

The fifth embodiment of the method is explained as referring FIG. 3. Either of two laser-transmissible molded workpieces as the same workpiece in the first embodiment is coated with ink or paint including the laser-absorbent 7 to obtain the laser-absorptive molded workpiece 2 having a layer 8 including the laser-absorbent. Thereto, another laser-transmissible molded workpiece 1 is put together. Laser 3 is irradiated from only a side of the latter laser-transmissible molded workpiece 1. The laser 3 is absorbed into the thin laser-absorptive layer 8 and causes the exothermic to execute the laser welding of the workpieces 1 and 2 through the laser-absorptive layer 8.

Incidentally, the laser-absorptive molded workpiece 2 having the laser-absorptive layer 8 including the laser-absorbent may be turned into the workpiece made from the laser-transmissible thermoplastic resin, the laser-absorptive thermoplastic elastomer or the laser-absorptive thermoplastic resin that is to be colored.

Those methods for the laser welding may be executed by joining of workpieces made from the laser-transmissible composition and the laser-absorptive composition respectively that include the polyolefin thermoplastic elastomer having same or different hardness.

The following merits of the laser welding are mentioned:
(1) feasibility of the welding without contact of a laser beam source and the position of the workpieces being due to weld;
(2) little thermal influence on periphery of the welding position by the local exothermic;
(3) no threat of mechanical vibration;
(4) feasibility of the welding of the refined workpieces or the three-dimensional workpieces;
(5) maintaining of sufficient airtightness;
(6) difficulty of recognizing of a boundary line of the welding by visual observation because of no burr on the welding surface; and
(7) no generation of dust and so on.

Furthermore it may apply parts of automobile and electric or electronic parts of products to practical use thereby.

In the method of the laser welding, the laser-transmittance of the laser-transmissible molded workpiece is at least 20% under wavelength of the irradiated laser used for the laser welding, that is ranging from approximate 800 nm of semiconductor laser to approximate 1200 nm of the yttrium aluminum garnet (YAG) laser. And it is preferable that the infrared-transmittance is at least 20% under one or more of the oscillated wavelengths of the practical laser for examples 808 nm, 840 nm, 940 nm and 1064 nm. If the transmittance is less than the range, the sufficient quantity of the laser of those wavelengths does not transmit. So the strength of the welded workpieces is insufficient, or unusual excess energy of the laser is needed.

On the occasion of the laser welding, the procedure for putting together and fixing of the laser-transmissible molded workpiece and the laser-absorptive molded workpiece with little gap closely is significant. It is preferable that the gap is adjusted within 0.02 mm by using a holding implement such as a clamp that fits the shape of the molded workpieces. If the molded workpieces have 0.02 mm of the gap, the welding strength decreases to half as compared with that of the molded workpieces having no gap. If the molded workpieces have 0.05 mm or more of the gap, welding cannot be executed.

Examples of a laser irradiation procedure are a scanning type procedure that laser is moved by scanning of the laser irradiation equipment; a masking type procedure that the welding workpieces are moved; a multi-irradiating type procedure that the welding workpieces are irradiated by the laser from multi way and so on. The desired laser irradiation procedure under the automobile industry is the scanning type procedure. The scanning speed thereof is preferably 5 m/min. because of superior productive efficiency.

In principle, the laser welding takes advantage of conversion of light energy of the laser to thermal energy. So the welding property is influenced by condition of the laser welding strikingly.

Generally, quantity of heat K that the laser-absorptive molded workpiece accepts on the surface thereof from the irradiated laser, is able to be calculated by the following numerical expression.

Quantity of Heat $(J/mm^2)$=Output Power of Laser $(W)$/Scanning Speed (mm/sec.)/Diameter of Laser Spot (mm)

The scanning speed needs raising for improving productive efficiency. According to the numerical expression, it is evident that the laser welding machine of high output power is necessary.

The proper quantity of heat of the laser-absorptive molded workpiece on the surface is necessary to improve the welding strength. So it is necessary to set up the optimum conditions by trying various conditions. Examples of the condition are raising the output power of the laser, slowing the scanning speed a little, and decreasing the diameter of the laser spot of irradiated area by laser on the surface of the laser-absorptive molded workpiece. If the quantity of heat on the surface by the laser is much, an appearance of the welded workpiece is spoiled with occurring excessive distortion at the welding position by the heat. If the quantity is too much, the laser-absorptive welded workpiece fumes. So setting up the proper condition of the laser welding is very important.

The quantity of heat: $K(J/mm^2)$ supplying on surface of the laser-absorptive molded workpiece by irradiating the laser with scanning provides preferably for the following numerical expression (1).

$$K=(p\times T)/(100\times q\times d)\geq 0.5 \quad (1)$$

(in the numerical expression (1), p(W) is output of the laser, T(%) is transmittance of the laser-transmissible molded workpiece under wavelength of the laser, q(mm/sec.) is the scanning speed, d(mm) is diameter of irradiating spot of the laser on the surface.)

Hereunder, embodiments of the laser-welded article using the laser-transmissible composition and the laser-absorptive composition of the present invention are explained.

The laser-welded article of the present invention consists the above-mentioned laser-transmissible molded workpiece made from the laser-transmissible composition and the above-mentioned laser-absorptive molded workpiece made from the laser-absorptive composition, which are welded together.

The laser-transmissible molded workpiece are manufactured by molding the laser-transmissible resin composition. The laser-transmissible composition are at least mixed the dynamic crosslinking polyolefin thermoplastic elastomer that has the melting point ranging from 160 to 210 degrees Centigrade in case of non-coloring, the dye salt exhibiting transmission of a laser having a wavelength of 800 to 1200 nm, and additive agents if necessary.

On the other hand, the laser-absorptive molded workpiece has at least the laser-absorptive layer that comes in contact with the laser-transmissible molded workpiece. Examples of the laser-absorptive molded workpiece are the workpiece made from the laser-absorptive composition including the additive laser-absorbent, and the workpiece having the applied resin layer including the laser-absorbent.

The laser-welded article of the present invention may be manufactured by single or plural irradiation of the laser. Example of the laser-welded article manufactured by the plural irradiation of the laser is the laser-welded article consisting of one laser-transmissible molded workpiece and one laser-absorptive molded workpiece and another laser-transmissible molded workpiece that are piled up one by one and welded. When the laser-absorptive molded workpiece is thin, it can be welded by the single irradiation of the laser. When the laser-absorptive molded workpiece is thick it should be welded by the plural irradiation of the laser.

Concrete embodiments of the manufacture process for the laser-welded article are explained as showing FIGS.

Although the laser-welded articles of the invention are manufactured by following steps (A) to (E) or (F) to (J), the laser-welded articles are not intended to be limited to specific embodiments.

When it is manufactured as shown FIG. 1, the processes thereof consist of the following (A) to (E).

(A) The laser-transmissible molded workpiece 1 is made from the laser-transmissible composition including the dynamic crosslinking polyolefin thermoplastic elastomer that has the melting point ranging from 160 to 210 degrees Centigrade in case of non-coloring, and the dye salt exhibiting transmission of the laser having the wavelength of 800 to 1200 nm.

(B) The laser-absorptive molded workpiece 2 including the dynamic crosslinking polyolefin thermoplastic elastomer that has the melting point ranging from 160 to 210 degrees Centigrade in case of non-coloring and the laser-absorbent 7, is put onto the laser-transmissible molded workpiece 1 together.

(C) Then the laser 3 is irradiated towards the laser-transmissible molded workpiece 1 under the condition that laser 3 transmits through the laser-transmissible molded workpiece 1, and is absorbed into the laser-absorptive molded workpiece 2.

(D) The irradiated laser 3 reaches to the laser-absorptive molded workpiece 2 and is absorbed into it, to cause the exothermic and then melt both workpieces 1 and 2 by the exothermic.

(E) The laser-transmissible molded workpiece 1 and the laser-absorptive molded workpiece 2 are welded firmly at the put position thereof.

When it is manufactured as shown FIG. 2, the processes thereof consist of the following (F) to (J).

(F) The plural laser-transmissible molded workpieces 1 are made from the laser-transmissible composition including the dynamic crosslinking polyolefin thermoplastic elastomer that has the melting point ranging from 160 to 210 degrees Centigrade in case of non-coloring, and the dye salt exhibiting transmission of the laser having the wavelength of 800 to 1200 nm.

(G) The laser-absorptive molded workpiece 2 including the dynamic crosslinking polyolefin thermoplastic elastomer that has the melting point ranging from 160 to 210 degrees Centigrade in case of non-coloring and the laser-absorbent 7, is sandwiched between the plural laser-transmissible molded workpieces 1.

(H) Then the laser 3 is irradiated towards the laser-transmissible molded workpieces 1 under the condition that laser 3 transmits through the laser-transmissible molded workpieces 1, and is absorbed into the laser-absorptive molded workpiece 2.

(I) The irradiated laser 3 reaches to the laser-absorptive molded workpiece 2 and is absorbed into it, to cause the exothermic and then melt all workpieces 1 and 2 by the exothermic.

(J) The laser-transmissible molded workpieces 1 and the laser-absorptive molded workpiece 2 are welded firmly at the put position thereof.

When it is manufactured as shown FIG. 3, the processes are similar as the above-mentioned processes.

Following examples are described by embodiments concretely. The invention is not intended to be limited to specific embodiments.

Manufacture Examples 1 to 7 in Table 3 show the colorant used for Examples mentioned later. Comparative Manufacture Examples 1 to 4 show the colorant used for the Comparative Examples mentioned later. In the Manufacture Examples, the acidic dyes correspond to the dyes of the above-mentioned Compound Examples.

However the acid dyes of Manufacture Examples 4 to 6 in Table 3 are the black colorant that is blended plural Compounds according to the ratio by weight shown in a column of the ratio of blending by the blender simply.

TABLE 3

| Examples | Colorant Acid Dye | Organic Amine | Ratio of Blending |
|---|---|---|---|
| Manufacture Example 1 | Compound Example 2-3 | Di-o-tolylguanidine | — |
| Manufacture Example 2 | Compound Example 1-2 | Di-o-tolylguanidine | — |
| Manufacture Example 3 | Compound Example 3-2 | Di-o-tolylguanidine | — |
| Manufacture Example 4 | Compound Example 1-2 | Di-o-tolylguanidine | 1 |
|  | Compound Example 3-2 | Di-o-tolylguanidine | 2 |
| Manufacture Example 5 | Compound Example 3-2 | Di-o-tolylguanidine | 2 |
|  | Compound Example 4-2 | Di-o-tolylguanidine | 1 |
| Manufacture Example 6 | Compound Example 2-3 | Di-o-tolylguanidine | 1 |
|  | Compound Example 1-2 | Di-o-tolylguanidine | 4 |
|  | Compound Example 3-2 | Di-o-tolylguanidine | 6 |
| Manufacture Example 7 | Compound Example 3-3 | Di-o-tolylguanidine | — |
| Comparative Manufacture Example 1 | C.I. Acid Green 27 | — | — |
| Comparative Manufacture Example 2 | C.I. Solvent Green 3 | — | — |
| Comparative Manufacture Example 3 | C.I. Pigment Green 7 | — | — |
| Comparative Manufacture Example 4 | Carbon black | — | — |

Hereunder, embodiments of the laser-transmissible composition using the dynamic crosslinking polyolefin thermoplastic elastomer and the same shaped test pieces as the laser-transmissible molded workpiece using the composition are shown to explain. The embodiments with applying the present invention are Examples 1 to 19. And the other embodiments without applying the present invention are Comparative Examples 1 to 7.

Incidentally TPV means an abbreviation of the dynamic crosslinking polyolefin thermoplastic elastomer, and TPO means an abbreviation of the polyolefin thermoplastic elastomer.

The method for determining the melting point is as follows. The samples of the elastomer are set on Flow Tester CFT-500D that is available from Shimadzu Corporation. Temperatures of melting of the samples are measured under conditions that the load is 5 kgf, the hole of the die has 1 mm of the length and 1 mm of the diameter, and the rising temperature rate is 5 degrees Centigrade per minute from 150 to 250 degrees Centigrade. The half point between the outflow termination and minimum is analyzed by using the flow curve thereof. The temperature at the half point regards as the melting point. It is namely the half-method.

EXAMPLE 1

400 g of the dynamic crosslinking polyolefin thermoplastic elastomer of catalog No. Asahi Kasei TPV A6110 that is available from Asahi Kasei Chemicals Corporation and has 178.6 degrees Centigrade of the melting point 0.40 g of the colorant of Manufacture Example 1

The above compounds were added in the tumbler made of stainless steel, and mixed with stirring for 1 hour. The obtained mixture as the laser-transmissible composition was executed the injection molding at 200 Centigrade degrees of temperature of a cylinder and 40 Centigrade degrees of temperature of a metal mold with general procedures using the injection molding machine of catalog No. Si-50 that is available from Toyo Machinery & Metal Co., Ltd. As shown in FIG. 1, a test workpiece that have length of 70 mm, width of 18 mm and thickness of 4 mm with the proviso of the end portion having the stair 4 of the thickness of 2 mm and length of 20 mm from the edge by lacking an under side thereof was obtained. The surface and appearance of the test workpiece were glossy, regular and yellow uniformly.

EXAMPLE 2

400 g of the dynamic crosslinking polyolefin thermoplastic elastomer of catalog No. Asahi Kasei TPV A6110 that is available from Asahi Kasei Chemicals Corporation and has 178.6 degrees Centigrade of the melting point 0.40 g of the colorant of Manufacture Example 2

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and red uniformly.

EXAMPLE 3

400 g of the dynamic crosslinking polyolefin thermoplastic elastomer of catalog No. Asahi Kasei TPV A6110 that is available from Asahi Kasei Chemicals Corporation and has 178.6 degrees Centigrade of the melting point 0.40 g of the colorant of Manufacture Example 3

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and green uniformly.

EXAMPLE 4

400 g of the dynamic crosslinking polyolefin thermoplastic elastomer of catalog No. Asahi Kasei TPV A6110 that is available from Asahi Kasei Chemicals Corporation and has 178.6 degrees Centigrade of the melting point 0.40 g of the colorant of Manufacture Example 4

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and violet uniformly.

EXAMPLE 5

400 g of the dynamic crosslinking polyolefin thermoplastic elastomer of catalog No. Asahi Kasei TPV A6110 that is available from Asahi Kasei Chemicals Corporation and has 178.6 degrees Centigrade of the melting point 4.00 g of the colorant of Manufacture Example 4

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and black uniformly.

EXAMPLE 6

400 g of the dynamic crosslinking polyolefin thermoplastic elastomer of catalog No. Asahi Kasei TPV A6110 that is available from Asahi Kasei Chemicals Corporation and has 178.6 degrees Centigrade of the melting point 4.00 g of the colorant of Manufacture Example 5

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and black uniformly.

EXAMPLE 7

400 g of the dynamic crosslinking polyolefin thermoplastic elastomer of catalog No. Asahi Kasei TPV A6110 that is available from Asahi Kasei Chemicals Corporation and has 178.6 degrees Centigrade of the melting point 4.00 g of the colorant of Manufacture Example 6

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and black uniformly.

EXAMPLE 8

400 g of the dynamic crosslinking polyolefin thermoplastic elastomer of catalog No. Asahi Kasei TPV A6110 that is available from Asahi Kasei Chemicals Corporation and has 178.6 degrees Centigrade of the melting point 4.00 g of the colorant of Manufacture Example 7

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and blue uniformly.

EXAMPLE 9

400 g of the dynamic crosslinking polyolefin thermoplastic elastomer of catalog No. Asahi Kasei TPV A9110 that is available from Asahi Kasei Chemicals Corporation and has 172.0 degrees Centigrade of the melting point 0.40 g of the colorant of Manufacture Example 1

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and yellow uniformly.

EXAMPLE 10

400 g of the dynamic crosslinking polyolefin thermoplastic elastomer of catalog No. Asahi Kasei TPV A9110 that is available from Asahi Kasei Chemicals Corporation and has 172.0 degrees Centigrade of the melting point 0.40 g of the colorant of Manufacture Example 2

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and red uniformly.

EXAMPLE 11

400 g of the dynamic crosslinking polyolefin thermoplastic elastomer of catalog No. Asahi Kasei TPV A9110 that is available from Asahi Kasei Chemicals Corporation and has 172.0 degrees Centigrade of the melting point 0.40 g of the colorant of Manufacture Example 3

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and green uniformly.

EXAMPLE 12

400 g of the dynamic crosslinking polyolefin thermoplastic elastomer of catalog No. Asahi Kasei TPV A9110 that is available from Asahi Kasei Chemicals Corporation and has 172.0 degrees Centigrade of the melting point 0.40 g of the colorant of Manufacture Example 4

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and violet uniformly.

EXAMPLE 13

400 g of the dynamic crosslinking polyolefin thermoplastic elastomer of catalog No. Asahi Kasei TPV A9110 that is available from Asahi Kasei Chemicals Corporation and has 172.0 degrees Centigrade of the melting point 4.00 g of the colorant of Manufacture Example 4

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and black uniformly.

EXAMPLE 14

400 g of the dynamic crosslinking polyolefin thermoplastic elastomer of catalog No. Asahi Kasei TPV A9110 that is available from Asahi Kasei Chemicals Corporation and has 172.0 degrees Centigrade of the melting point 4.00 g of the colorant of Manufacture Example 5

The above compounds were added in the tumbler made of stainless steel, and mixed with stirring for 1 hour. The obtained mixture was executed injection. molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and black uniformly.

EXAMPLE 15

400 g of the dynamic crosslinking polyolefin thermoplastic elastomer of catalog No. Asahi Kasei TPV A9110 that is available from Asahi Kasei Chemicals Corporation and has 172.0 degrees Centigrade of the melting point 4.00 g of the colorant of Manufacture Example 6

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and black uniformly.

EXAMPLE 16

400 g of the dynamic crosslinking polyolefin thermoplastic elastomer of catalog No. Asahi Kasei TPV A8120 that is available from Asahi Kasei Chemicals Corporation and has 165.2 degrees Centigrade of the melting point 4.00 g of the colorant of Manufacture Example 4

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and blue-black uniformly.

EXAMPLE 17

400 g of the dynamic crosslinking polyolefin thermoplastic elastomer of catalog No. Asahi Kasei TPV B8130 that is available from Asahi Kasei Chemicals Corporation and has 171.0 degrees Centigrade of the melting point 4.00 g of the colorant of Manufacture Example 4

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and black uniformly.

EXAMPLE 18

400 g of the dynamic crosslinking polyolefin thermoplastic elastomer of trade mane: Soft Milastomer that is available from Mitsui Chemicals Corporation and has 202.4 degrees Centigrade of the melting point 4.00 g of the colorant of Manufacture Example 4

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and black uniformly.

EXAMPLE 19

400 g of the dynamic crosslinking polyolefin thermoplastic elastomer of trade mane: Hard Milastomer that is available from Mitsui Chemicals Corporation and has 175.5 degrees Centigrade of the melting point 4.00 g of the colorant of Manufacture Example 4

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test workpiece were glossy, regular and black uniformly.

COMPARATIVE EXAMPLE 1

400 g of the dynamic crosslinking polyolefin thermoplastic elastomer of catalog No. Asahi Kasei TPV A6110 that is available from Asahi Kasei Chemicals Corporation and has 178.6 degrees Centigrade of the melting point 0.40 g of the colorant of Comparative Manufacture Example 1

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The test workpiece was green with insufficient dispersion by visual observation obviously.

COMPARATIVE EXAMPLES 2 TO 4

In Comparative Examples 2 to 4, test workpieces were manufactured as same as the Comparative Example 1 according to Table 4.

COMPARATIVE EXAMPLE 5

400 g of crosslinking polyolefin thermoplastic elastomer of catalog No. Santoprene 8211-65 that is available from Advanced Elastomer Systems Japan Ltd. and has 235.1 degrees Centigrade of the melting point 4.00 g of the colorant of Manufacture Example 4

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test laser-absorptive molded workpiece were more or less glossy, regular and black uniformly.

COMPARATIVE EXAMPLE 6 non-colored crosslinking polyolefin thermoplastic elastomer of catalog No. Santoprene 8211-65 that is available from Advanced Elastomer Systems Japan Ltd. and has 235.1 degrees Centigrade of the melting point The above compound was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A white test workpiece was obtained.

COMPARATIVE EXAMPLE 7 non-colored polyolefin thermoplastic elastomer of catalog No. Vyram 9201-65 that is available from Advanced Elastomer Systems Japan Ltd. and does not have the melting point because of no-melting and impossible measurement The above compound was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A pale yellow test workpiece was obtained.

TABLE 4

| Examples | Colorant | Concentration (%) | Hue | Thermoplastic Elastomer |
|---|---|---|---|---|
| Example 1 | Manufacture Example 1 | 0.1 | Yellow | TPV_A6110 |
| Example 2 | Manufacture Example 2 | 0.1 | Red | TPV_A6110 |
| Example 3 | Manufacture Example 3 | 0.1 | Green | TPV_A6110 |
| Example 4 | Manufacture Example 4 | 0.1 | Violet | TPV_A6110 |
| Example 5 | Manufacture Example 4 | 1 | Black | TPV_A6110 |
| Example 6 | Manufacture Example 5 | 1 | Black | TPV_A6110 |
| Example 7 | Manufacture Example 6 | 1 | Black | TPV_A6110 |
| Example 8 | Manufacture Example 7 | 1 | Blue | TPV_A6110 |
| Comparative Example 1 | Comparative Manufacture Example 1 | 0.1 | Green | TPV_A6110 |
| Comparative Example 2 | Comparative Manufacture Example 2 | 0.1 | Green | TPV_A6110 |
| Comparative Example 3 | Comparative Manufacture Example 3 | 0.1 | Green | TPV_A6110 |
| Comparative Example 4 | Comparative Manufacture Example 4 | 0.1 | Black | TPV_A6110 |
| Example 9 | Manufacture Example 1 | 0.1 | Yellow | TPV_A9110 |
| Example 10 | Manufacture Example 2 | 0.1 | Red | TPV_A9110 |
| Example 11 | Manufacture Example 3 | 0.1 | Green | TPV_A9110 |
| Example 12 | Manufacture Example 4 | 0.1 | Violet | TPV_A9110 |
| Example 13 | Manufacture Example 4 | 1 | Black | TPV_A9110 |
| Example 14 | Manufacture Example 5 | 1 | Black | TPV_A9110 |
| Example 15 | Manufacture Example 6 | 1 | Black | TPV_A9110 |

TABLE 4-continued

| Examples | Colorant | Concentration (%) | Hue | Thermoplastic Elastomer |
|---|---|---|---|---|
| Example 16 | Manufacture Example 4 | 1 | Blue-black | TPV__A8120 |
| Example 17 | Manufacture Example 4 | 1 | Black | TPV__B8130 |
| Example 18 | Manufacture Example 4 | 1 | Black | Soft Milastomer |
| Example 19 | Manufacture Example 4 | 1 | Black | Hard Milastomer |
| Comparative Example 5 | Manufacture Example 4 | 1 | Blue-black | TPV__8211-65 |
| Comparative Example 6 | Non-colored | 0 | White | TPV__8211-65 |
| Comparative Example 7 | Non-colored | 0 | Pale Yellow | TPO__9201-65 |

(Physical Evaluation of the Laser-Transmissible Molded Workpiece)

The test workpieces as the laser-transmissible molded workpiece made from the laser-transmissible composition obtained in Examples 1 to 19 and Comparative Examples 1 to 7, and molded non-colored test workpieces as blank made similarly from the crosslinking polyolefin thermoplastic elastomer were evaluated by the following physical evaluations. The results thereof are shown in table 5.

(1) Evaluation of the Dispersibility

When the test workpiece made by the above-mentioned injection molding was colored uniformly by visual observation, the dispersibility thereof was evaluated to be excellent.

(2) Determination of the Transmittance

Each of test workpiece was set up onto a spectrophotometer of catalog No. V-570 that is available from JASCO Corporation. The transmittance of the stair portion 4 with thickness of 2.0 mm of the workpiece 1 that is shown in FIG. 1 was determined under the wavelength λ ranging from 400 to 1200 nm. In table 5, the transmittance of the test workpieces under the wavelength of 840 nm by semiconductor laser, is shown.

(3) Evaluation of Heat Resistance

The injection molding was executed in Examples 1 to 19 or Comparative Examples 1 to 5. Respectively a part of the blended mixture was executed general shots of the injection molding, to obtain initiative test workpieces. Respectively the remainder of the mixture in the cylinder was kept at the same temperature of the cylinder for 15 minutes, and then it was executed the same shots of the injection molding to obtain subsequent test workpieces.

The hues of the initiative test workpieces that are obtained by the general shots and the subsequent test workpieces that are obtained by the same shots after keeping in the cylinder for 15 minutes, were compared. When the hue of the subsequent test workpieces was not faded out as compared with the initiative test workpieces, it was evaluated to have the heat resistance.

(4) Evaluation of Bleeding Resistance

The general shots of the injection molding using the respective colorants were executed in Examples 1 to 19 or Comparative Examples 1 to 5 to obtain the test workpieces. One of workpieces and a prescribed workpiece that the laser welding should be executed were put together. Towards the put direction, it was pressed with approximately 200 g/cm² (i.e. 1.96 N/cm²) and kept at 80 degrees Centigrade for 48 hours. Then the color of the prescribed workpiece with migrating was observed. When the migrating of the colorant was not recognized, the bleeding resistance was evaluated to be excellent.

TABLE 5

Physical Evaluation of Test Workpiece of Laser-transmissible Molded Workpiece

| Examples | Thermoplastic Elastomer | Hardness Shore A | Colorant Manufacture Examples | Concentration (%) | Dispersibility | Transmissivity (%) | Heat Resistance | Bleeding Resistance |
|---|---|---|---|---|---|---|---|---|
| (Blank 1) | TPV__A6110 | 60 | NC | 0 | — | 62 | — | — |
| Example 1 | TPV__A6110 | 60 | Manufacture Example 1 | 0.1 | ○ | 62 | ○ | ○ |
| Example 2 | TPV__A6110 | 60 | Manufacture Example 2 | 0.1 | ○ | 60 | ○ | ○ |
| Example 3 | TPV__A6110 | 60 | Manufacture Example 3 | 0.1 | ○ | 59 | ○ | ○ |
| Example 4 | TPV__A6110 | 60 | Manufacture Example 4 | 0.1 | ○ | 59 | ○ | ○ |
| Example 5 | TPV__A6110 | 60 | Manufacture Example 4 | 1 | ○ | 35 | ○ | ○ |
| Example 6 | TPV__A6110 | 60 | Manufacture Example 5 | 1 | ○ | 43 | ○ | ○ |
| Example 7 | TPV__A6110 | 60 | Manufacture Example 6 | 1 | ○ | 35 | ○ | ○ |
| Example 8 | TPV__A6110 | 60 | Manufacture Example 7 | 1 | ○ | 35 | ○ | ○ |
| Comparative Example 1 | TPV__A6110 | 60 | Comparative Manufacture Example 1 | 0.1 | X | 44 | — | — |
| Comparative Example 2 | TPV__A6110 | 60 | Comparative Manufacture Example 2 | 0.1 | ○ | 48 | ○ | X |
| Comparative Example 3 | TPV__A6110 | 60 | Comparative Manufacture Example 3 | 0.1 | ○ | 20 | ○ | ○ |

TABLE 5-continued

Physical Evaluation of Test Workpiece of Laser-transmissible Molded Workpiece

| Examples | Thermoplastic Elastomer | Hardness Shore A | Colorant Manufacture Examples | Concentration (%) | Dispersibility | Transmissivity (%) | Heat Resistance | Bleeding Resistance |
|---|---|---|---|---|---|---|---|---|
| Comparative Example 4 | TPV_A6110 | 60 | Comparative Manufacture Example 4 | 0.1 | ○ | 0 | ○ | ○ |
| (Blank 2) | TPV_A9110 | 90 | NC | 0 | — | 48 | — | — |
| Example 9 | TPV_A9110 | 90 | Manufacture Example 1 | 0.1 | ○ | 47 | ○ | ○ |
| Example 10 | TPV_A9110 | 90 | Manufacture Example 2 | 0.1 | ○ | 47 | ○ | ○ |
| Example 11 | TPV_A9110 | 90 | Manufacture Example 3 | 0.1 | ○ | 45 | ○ | ○ |
| Example 12 | TPV_A9110 | 90 | Manufacture Example 4 | 0.1 | ○ | 46 | ○ | ○ |
| Example 13 | TPV_A9110 | 90 | Manufacture Example 4 | 1 | ○ | 33 | ○ | ○ |
| Example 14 | TPV_A9110 | 90 | Manufacture Example 5 | 1 | ○ | 33 | ○ | ○ |
| Example 15 | TPV_A9110 | 90 | Manufacture Example 6 | 1 | ○ | 33 | ○ | ○ |
| (Blank 3) | TPV_A8120 | 80 | NC | 0 | — | 35 | — | — |
| Example 16 | TPV_A8120 | 80 | Manufacture Example 4 | 1 | ○ | 30 | ○ | ○ |
| (Blank 4) | TPV_B8130 | 80 | NC | 0 | — | 50 | — | — |
| Example 17 | TPV_B8130 | 80 | Manufacture Example 4 | 1 | ○ | 36 | ○ | ○ |
| (Blank 5) | SoftMilastomer | — | NC | 0 | — | 49 | — | — |
| Example 18 | SoftMilastomer | — | Manufacture Example 4 | 1 | ○ | 31 | ○ | ○ |
| (Blank 6) | HardMilastomer | — | NC | 0 | — | 42 | — | — |
| Example 19 | HardMilastomer | — | Manufacture Example 4 | 1 | ○ | 32 | ○ | ○ |
| Comparative Example 5 | TPV_8211-65 | 65 | Manufacture Example 4 | 1 | Δ | 16 | ○ | ○ |
| Comparative Example 6 (Blank7) | TPV_8211-65 | 65 | NC | 0 | — | 31 | — | — |
| Comparative Example 5 | TPO_9201-65 | 65 | NC | 0 | — | 18 | — | — |

"NC" indicates only natural resin.
"○" indicates excellent,
"Δ" indicates existence of a little aggregation,
"X" indicates bat and
"—" indicates no-test in the column of the evaluation of the dispersibility.
"○" indicates excellent,
"X" indicates bat and
"—" indicates no-test in the column of the evaluation of the heat resistance and the bleeding resistance.

Hereunder, embodiments of the laser-absorptive composition using the dynamic crosslinking polyolefin thermoplastic elastomer or the polypropylene rein and the same shaped test pieces as the laser-absorptive molded workpiece using the composition are shown to explain in Examples 20 to 27 and Comparative Examples 8 to 9.

EXAMPLE 20

400 g of the dynamic crosslinking polyolefin thermoplastic elastomer of catalog No. Asahi Kasei TPV A6110 that is available from Asahi Kasei Chemicals Corporation and has 178.6 degrees Centigrade of the melting point
0.40 g of carbon black The above compounds were added in the tumbler made of stainless steel, and mixed with stirring for 1 hour. The obtained mixture was executed the injection molding at 200 Centigrade degrees of temperature of a cylinder and 40 Centigrade degrees of temperature of a metal mold with general procedures using the injection molding machine of catalog No. Si-50 that is available from Toyo Machinery & Metal Co., Ltd. As shown in FIG. 1, a test workpiece that have length of 70 mm, width of 18 mm and thickness of 4 mm with the proviso of the end portion having the stair 5 of the thickness of 2 mm and length of 20 mm from the edge by lacking an upper side thereof was obtained. The surface and appearance of the test laser-absorptive molded workpiece were glossy, regular and black uniformly.

EXAMPLE 21

400 g of the dynamic crosslinking polyolefin thermoplastic elastomer of catalog No. Asahi Kasei TPV A9110 that is available from Asahi Kasei Chemicals Corporation
0.40 g of carbon black The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test laser-absorptive molded workpiece were glossy, regular and black uniformly.

EXAMPLE 22

400 g of the dynamic crosslinking polyolefin thermoplastic elastomer of catalog No. Asahi Kasei TPV A8120 that is available from Asahi Kasei Chemicals Corporation and has 165.2 degrees Centigrade of the melting point 0.40 g of carbon black The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test laser-absorptive molded workpiece were glossy, regular and black uniformly.

EXAMPLE 23

400 g of the dynamic crosslinking polyolefin thermoplastic elastomer of catalog No. Asahi Kasei TPV B8130 that is available from Asahi Kasei Chemicals Corporation and has 171.0 degrees Centigrade of the melting point 0.40 g of carbon black The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test laser-absorptive molded workpiece were glossy, regular and black uniformly.

EXAMPLE 24

400 g of the dynamic crosslinking polyolefin thermoplastic elastomer of trade mane: Soft Milastomer that is available from Mitsui Chemicals Corporation and has 202.4 degrees Centigrade of the melting point 0.40 g of carbon black The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test laser-absorptive molded workpiece were glossy, regular and black uniformly.

EXAMPLE 25

400 g of the dynamic crosslinking polyolefin thermoplastic elastomer of trade mane: Hard Milastomer that is available from Mitsui Chemicals Corporation and has 175.5 degrees Centigrade of the melting point 0.40 g of carbon black The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test laser-absorptive molded workpiece were glossy, regular and black uniformly.

COMPARATIVE EXAMPLE 8

400 g of crosslinking polyolefin thermoplastic elastomer of catalog No. Santoprene 8211-65 that is available from Advanced Elastomer Systems Japan Ltd. and has 235.1 degrees Centigrade of the melting point 0.40 g of carbon black The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test laser-absorptive molded workpiece were more or less glossy, regular and gray uniformly.

COMPARATIVE EXAMPLE 9

400 g of polyolefin thermoplastic elastomer (TPO) of catalog No. Vyram 9201-65 that is available from Advanced Elastomer Systems Japan Ltd. and does not have the melting point because of insufficient-melting and impossible measurement 0.40 g of carbon black The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The test laser-absorptive molded workpiece was gray with insufficient dispersion by visual observation.

EXAMPLE 26

400 g of polypropylene resin (PP-T) filling talc 2.0 g of carbon black

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test laser-absorptive molded workpiece were glossy, regular and black uniformly.

EXAMPLE 27

400 g of the dynamic crosslinking polyolefin thermoplastic elastomer of catalog No. Asahi Kasei TPV A6110 that is available from Asahi Kasei Chemicals Corporation and has 178.6 degrees Centigrade of the melting point 4.00 g of phthalocyanine dyestuff: C.I. Solvent Blue 70

The above compounds were added in the tumbler made of stainless steel, and mixed with stirring for 1 hour. The obtained mixture was executed injection molding at 200 Centigrade degree of temperature of a cylinder and 40 Centigrade degree of temperature of a metal mold with general procedures using the injection molding machine of catalog No. Si-50 that is available from Toyo Machinery & Metal Co., Ltd. A test workpiece was obtained. The surface and appearance of the test laser-absorptive molded workpiece were glossy, regular and blue uniformly.

(Physical Evaluation of the Laser-Absorptive Molded Workpiece)

The workpieces of Examples 20 to 27 were evaluated by the same physical evaluations as the Examples 1 to 19. The results thereof are shown in table 6 and 7.

(5) Appearance and Glossiness by the Determination of OD Value

Respectively appearance of the test workpiece was evaluated by determination of reflection density: OD using a reflection density meter TR-927 that is available from Macbeth. It is evaluated that the test workpiece having higher OD value has higher black content and more excellent smoothness and glossiness.

TABLE 6

Physical Evaluation of Laser-absorptive Molded Workpiece Using Black Laser-absorbent

| Examples | Thermoplastic Elastomer or Thermoplastic Resin | Hardness Shore A | Absorbent Black Absorbent | Concentration (%) | Dispersibility | Evaluation or Determination Transmissivity (%) | OD Value |
|---|---|---|---|---|---|---|---|
| (Blank 1) | TPV_A6110 | 60 | NC | 0 | — | 62 | — |
| Example 20 | TPV_A6110 | 60 | CarbonBlack | 0.1 | ○ | 0 | 2.01 |
| Example 21 | TPV_A9110 | 90 | CarbonBlack | 0.1 | ○ | 0 | 1.84 |
| Example 22 | TPV_A8120 | 80 | CarbonBlack | 0.1 | ○ | 0 | 1.65 |
| Example 23 | TPV_B8130 | 80 | CarbonBlack | 0.1 | ○ | 0 | 1.84 |
| Example 24 | SoftMilastomer | — | CarbonBlack | 0.1 | ○ | 0 | 1.60 |
| Example 25 | HardMilastomer | — | CarbonBlack | 0.1 | ○ | 0 | 1.74 |
| Comparative Example 8 | TPV_8211-65 | 65 | CarbonBlack | 0.1 | Δ | 0 | 1.24 |
| Comparative Example 9 | TPO_9201-65 | 65 | CarbonBlack | 0.1 | X | 0 | 0.84 |
| Example 26 | PP-T | — | CarbonBlack | 0.5 | ○ | 0 | 1.76 |

"NC" indicates only natural resin.

"○" indicates excellent,

"Δ" indicates existence of a little aggregation,

"X" indicates bat and

"—" indicates no-test in the column of the evaluation of the dispersibility.

TABLE 7

Physical Evaluation of Laser-absorptive Molded Workpiece Using Blue Laser-absorbent

| Examples | Thermoplastic Elastomer | Hardness Shore A | Absorbent Blue Absorbent | Concentration (%) | Dispersibility | Evaluation or Determination Transmissivity (%) | OD Value |
|---|---|---|---|---|---|---|---|
| (Blank 1) | TPV_A6110 | 60 | NC | 0 | — | 62 | — |
| Example 27 | TPV_A6110 | 60 | C.I. Solvent Blue 70 | 1 | ○ | 0 | — |

"NC" indicates only natural resin.

"○" indicates excellent,

"Δ" indicates existence of a little aggregation,

"X" indicates bat and

"—" indicates no-test in the column of the evaluation of the dispersibility.

(Physical Evaluation of the Welded Workpieces)

Hereunder, embodiments of laser welding of the test laser-transmissible molded workpieces of Examples 1 to 19 and the test laser-absorptive molded workpieces of Examples 20 to 27 were executed as follows. The welded workpieces were evaluated.

(6) Evaluation of Welding

As shown in FIG. 1, each of the laser-transmissible test workpiece 1 of Examples 1 to 19 and Comparative Examples 1 to 7 and each of the laser-absorptive test workpiece 2 of Examples 20 to 27 and Comparative Examples 8 to 9 have length of 70 mm, width of 18 mm, thickness of 4 mm with the proviso of the thickness of 2.0 mm of the end portion of length of 20 mm from the edge. Each of the stairs 4 and 5: end portion of the workpieces having length of 20 mm, width of 18 mm and thickness of 2 mm, were put together.

The diode laser machine having 30 W of the output power that is available form Fine Device Co., Ltd. was used. The scanning laser beam 3 having 0.6 mm of the diameter of irradiating spot of the wavelength of 840 nm was continuously irradiated from upper side of the test workpiece 1 towards the put portion to a transverse direction indicated by an arrow of FIG. 1, by the machine under various scanning speed.

The laser transmitted through the laser-transmissible test workpiece 1, and was absorbed into the laser-absorptive test workpiece 2. The laser-absorptive test workpiece 2 caused the exothermic then melted at a laser-absorbing neighborhood by the exothermic. And the laser-transmissible test workpiece 1 was melted thereby, to weld both workpieces. After cooling, the both workpieces were joined tightly. The portion 6 in FIG. 1 shows the welded portion.

It is evaluated that the welded test workpieces having the sufficient welding strength by the above laser welding has excellent welding property. The results thereof are shown in tables 8 to 10.

(7) Determination of Tensile Strength

The above-mentioned welded workpieces were used for determination of tensile strength using a tensile testing instrument of catalog No. Tensilon RTC 1300 that is available from A&D Company Ltd. As regards the welded workpieces, they were tensed under 500 mm/min. of tensile speed to both opposite directions of lengthwise of a laser-transmissible test workpiece 1 side and a laser-absorptive test workpiece 2 side: the directions pulled off the workpiece 1 and the workpiece 2 apart of FIG. 1 in accordance with JIS K-6251-1993, to determine the tensile strength of welding by the tensile strength test. The results thereof are shown in tables 8 to 10.

TABLE 8

Evaluation of Welding of Combinations with Laser-transmissible Workpiece and Laser-absorptive Workpiece

| Welding Examples | Laser-transmissible Workpiece Examples | Laser-absorptive Workpiece Examples | Scanning Speed (mm/sec) | Evaluation of Welding |
|---|---|---|---|---|
| Welding Example 1 | TPV_A6110 | Example 20 | 30 | ○ |
| Welding Example 2 | Example 1 | Example 20 | 30 | ○ |
| Welding Example 3 | Example 2 | Example 20 | 30 | ○ |
| Welding Example 4 | Example 3 | Example 20 | 30 | ○ |
| Welding Example 5 | Example 4 | Example 20 | 30 | ○ |
| Welding Example 6 | Example 5 | Example 20 | 30 | ○ |
| Welding Example 7 | Example 5 | Example 26 | 30 | ○ |
| Welding Example 8 | Example 6 | Example 20 | 30 | ○ |
| Welding Example 9 | Example 7 | Example 20 | 30 | ○ |
| Welding Example 10 | Example 8 | Example 21 | 30 | ○ |
| Welding Example 11 | Example 7 | Example 21 | 30 | ○ |
| Welding Example 12 | Example 7 | Example 26 | 30 | ○ |
| Welding Example 13 | Example 8 | Example 27 | 30 | ○ |
| Comparative Welding Example 1 | Comparative Example 1 | Example 20 | 30 | ○ |
| Comparative Welding Example 2 | Comparative Example 2 | Example 20 | 30 | ○ |
| Comparative Welding Example 3 | Comparative Example 3 | Example 20 | 30 | X |
| Comparative Welding Example 4 | Comparative Example 4 | Example 20 | 30 | X |
| Welding Example 14 | TPV_A9110 | Example 21 | 30 | ○ |
| Welding Example 15 | Example 9 | Example 21 | 30 | ○ |
| Welding Example 16 | Example 10 | Example 21 | 30 | ○ |
| Welding Example 17 | Example 11 | Example 21 | 30 | ○ |
| Welding Example 18 | Example 12 | Example 21 | 30 | ○ |
| Welding Example 19 | Example 13 | Example 21 | 30 | ○ |
| Welding Example 20 | Example 14 | Example 21 | 30 | ○ |
| Welding Example 21 | Example 15 | Example 21 | 30 | ○ |
| Welding Example 22 | Example 15 | Example 20 | 30 | ○ |
| Welding Example 23 | Example 15 | Example 26 | 30 | ○ |
| Welding Example 24 | TPV_A8120 | Example 22 | 30 | ○ |
| Welding Example 25 | Example 16 | Example 22 | 30 | ○ |
| Welding Example 26 | TPV_A8120 | Example 26 | 30 | ○ |
| Welding Example 27 | Example 16 | Example 26 | 30 | ○ |
| Welding Example 28 | TPV_B8130 | Example 23 | 30 | ○ |
| Welding Example 29 | Example 17 | Example 23 | 30 | ○ |
| Welding Example 30 | TPV_B8130 | Example 26 | 30 | ○ |
| Welding Example 31 | Example 17 | Example 26 | 30 | ○ |
| Welding Example 32 | Soft Milastomer | Example 24 | 30 | ○ |

TABLE 8-continued

Evaluation of Welding of Combinations with Laser-transmissible Workpiece and Laser-absorptive Workpiece

| Welding Examples | Laser-transmissible Workpiece Examples | Laser-absorptive Workpiece Examples | Scanning Speed (mm/sec) | Evaluation of Welding |
|---|---|---|---|---|
| Welding Example 33 | Example 18 | Example 24 | 30 | ○ |
| Welding Example 34 | Soft Milastomer | Example 26 | 30 | ○ |
| Welding Example 35 | Example 18 | Example 26 | 30 | ○ |
| Welding Example 36 | Hard Milastomer | Example 25 | 30 | ○ |
| Welding Example 37 | Example 19 | Example 25 | 30 | ○ |
| Welding Example 38 | Hard Milastomer | Example 26 | 30 | ○ |
| Welding Example 39 | Example 19 | Example 26 | 30 | ○ |
| Comparative Welding Example 5 | Comparative Example 6 | Comparative Example 8 | 30 | ○ |
| Comparative Welding Example 6 | Comparative Example 5 | Comparative Example 8 | 30 | X |
| Comparative Welding Example 7 | Comparative Example 6 | Example 26 | 30 | ○ |
| Comparative Welding Example 8 | Comparative Example 5 | Example 26 | 30 | X |
| Comparative Welding Example 9 | Comparative Example 7 | Comparative Example 8 | 30 | X |

"○" indicates welded and
"X" indicates notwelded in the column of the evaluation of the welding.

TABLE 9

Evaluation of Welding under Various Scanning

| Welding Examples | Laser-transmissible Workpiece Examples | Elastomer (Trade Name) | Laser-absorptive Workpiece Examples | Elastomer (Trade Name) | Laser Welding Conditions and Evaluation of Welding Scanning Speed (mm/sec) | | | | | |
|---|---|---|---|---|---|---|---|---|---|---|
| | | | | | 20 | 30 | 40 | 50 | 60 | 70 |
| *Welding Examples and Comparative Welding Example for Laser-welded Article with No Colorant* | | | | | | | | | | |
| Welding Example 1 | NC | TPV_A6110 | Example 20 | TPV_A6110 | ○ | ○ | ○ | ○ | ○ | X |
| Welding Example 14 | NC | TPV_A9110 | Example 21 | TPV_A9110 | ○ | ○ | ○ | X | X | X |
| Comparative Welding Example 5 | NC | TPV_8211-65 | Comparative Example 8 | TPV_8211-65 | ○ | ○ | X | X | X | X |
| Comparative Welding Example 9 | NC | TPO_9201-65 | Comparative Example 8 | TPV_8211-65 | X | X | X | X | X | X |
| *Welding Examples and Comparative Welding Example for Laser-welded Article with 0.1% Colorant* | | | | | | | | | | |
| Welding Example 3 | Example 2 | TPV_A6110 | Example 20 | TPV_A6110 | ○ | ○ | ○ | ○ | ○ | X |
| Comparative Welding Example 3 | Comparative Example 3 | TPV_A6110 | Example 20 | TPV_A6110 | ○ | X | X | X | X | X |
| *Welding Examples and Comparative Welding Example for Laser-welded Article with 1% Colorant* | | | | | | | | | | |
| Welding Example 6 | Example 5 | TPV_A6110 | Example 20 | TPV_A6110 | ○ | ○ | X | X | X | X |
| Welding Example 8 | Example 6 | TPV_A6110 | Example 20 | TPV_A6110 | ○ | ○ | ○ | X | X | X |
| Comparative Welding Example 6 | Comparative Example 5 | TPV_8211-65 | Comparative Example 8 | TPV_8211-65 | X | X | X | X | X | X |
| Welding Example 19 | Example 13 | TPV_A9110 | Example 21 | TPV_A9110 | ○ | ○ | X | X | X | X |
| Welding Example 25 | Example 16 | TPV_A8120 | Example 22 | TPV_A8120 | ○ | ○ | X | X | X | X |
| Welding Example 29 | Example 17 | TPV_B8130 | Example 23 | TPV_B8130 | ○ | ○ | X | X | X | X |

TABLE 9-continued

Evaluation of Welding under Various Scanning

| Welding Examples | Laser-transmissible Workpiece Examples | Elastomer (Trade Name) | Laser-absorptive Workpiece Examples | Elastomer (Trade Name) | Laser Welding Conditions and Evaluation of Welding Scanning Speed (mm/sec) | | | | | |
|---|---|---|---|---|---|---|---|---|---|---|
| | | | | | 20 | 30 | 40 | 50 | 60 | 70 |
| Welding Example 33 | Example 18 | Soft Milastomer | Example 24 | Soft Milastomer | ○ | ○ | X | X | X | X |
| Welding Example 37 | Example 19 | Hard Milastomer | Example 25 | Hard Milastomer | ○ | ○ | X | X | X | X |

"○" indicates welded and
"X" indicates notwelded in the column of the evaluation of the welding.

TABLE 10

Determination of Tensile Strength of Welding under Various Scanning Speed

| Welding Examples | Laser-transmissible Workpiece Examples | Transmittance (%) | Laser-absorptive Workpiece Examples | Scanning Speed (mm/sec) | Quantity of Heat on Surface of laser-absorptive molded Workpiece [J/mm²] | Evaluation of Welding | Determination of Tensile Strength (MPa) |
|---|---|---|---|---|---|---|---|
| *Welding Examples and Comparative Welding Example for Laser-welded Article with No Colorant* ||||||||
| Welding Example 1 | TPV_A6110 | 62 | Example 20 | 70 | 0.44 | X | 0 |
| | | | | 60 | 0.52 | ○ | 2.7 |
| | | | | 50 | 0.62 | ○ | 3.5 |
| | | | | 40 | 0.78 | ○ | 4.0 |
| | | | | 30 | 1.03 | ○ | 4.6 |
| Welding Example 14 | TPV_A9110 | 48 | Example 21 | 50 | 0.49 | X | 0 |
| | | | | 40 | 0.60 | ○ | 3.9 |
| | | | | 30 | 0.80 | ○ | 4.8 |
| Welding Example 28 | TPV_B8130 | 50 | Example 23 | 60 | 0.42 | X | 0 |
| | | | | 50 | 0.50 | ○ | 2.8 |
| | | | | 40 | 0.63 | ○ | 3.5 |
| | | | | 30 | 0.83 | ○ | 4.4 |
| Welding Example 36 | Hard Milastomer | 42 | Example 25 | 50 | 0.42 | X | 0 |
| | | | | 40 | 0.53 | ○ | 2.5 |
| | | | | 30 | 0.70 | ○ | 3.1 |
| Comparative Welding Example 5 | TPV_8211-65 Comparative Example 6 | 31 | Comparative Example 8 | 40 | 0.39 | X | 0 |
| | | | | 30 | 0.52 | ○ | 2.1 |
| | | | | 20 | 0.78 | ○ | 2.7 |
| *Welding Examples and Comparative Welding Example for Laser-welded Article with 0.1% Colorant* ||||||||
| Welding Example 3 | Example 2 | 60 | Example 20 | 70 | 0.43 | X | 0 |
| | | | | 60 | 0.50 | ○ | 2.7 |
| | | | | 50 | 0.60 | ○ | 3.5 |
| | | | | 40 | 0.75 | ○ | 5.1 |
| | | | | 30 | 1.00 | ○ | 6.0 |
| Comparative Welding Example 3 | Comparative Example 3 | 20 | Example 20 | 40 | 0.25 | X | 0 |
| | | | | 30 | 0.33 | X | 0 |
| | | | | 20 | 0.50 | ○ | 2.5 |
| *Welding Examples and Comparative Welding Example for Laser-welded Article with 1% Colorant* ||||||||
| Welding Example 6 | Example 5 | 35 | Example 20 | 40 | 0.44 | X | 0 |
| | | | | 30 | 0.58 | ○ | 2.3 |
| | | | | 20 | 0.88 | ○ | 5.0 |
| Welding Example 19 | Example 13 | 33 | Example 21 | 40 | 0.41 | X | 0 |
| | | | | 30 | 0.55 | ○ | 3.2 |
| | | | | 20 | 0.83 | ○ | 5.5 |

TABLE 10-continued

Determination of Tensile Strength of Welding under Various Scanning Speed

| | | | | Laser Welding Conditions, Determination and Evaluation | | | |
|---|---|---|---|---|---|---|---|
| Welding Examples | Laser-transmissible Workpiece Examples | Transmittance (%) | Laser-absorptive Workpiece Examples | Scanning Speed (mm/sec) | Quantity of Heat on Surface of laser-absorptive molded Workpiece [J/mm²] | Evaluation of Welding | Determination of Tensile Strength (MPa) |
| Welding Example 29 | Example 17 | 36 | Example 23 | 40 | 0.45 | X | 0 |
| | | | | 30 | 0.60 | ○ | 3.5 |
| | | | | 20 | 0.90 | ○ | 5.9 |
| Welding Example 37 | Example 19 | 32 | Example 25 | 40 | 0.40 | X | 0 |
| | | | | 30 | 0.53 | ○ | 2.9 |
| | | | | 20 | 0.80 | ○ | 4.8 |
| Comparative Welding Example 6 | Comparative Example 5 | 16 | Comparative Example 8 | 40 | 0.20 | X | 0 |
| | | | | 30 | 0.27 | X | 0 |
| | | | | 20 | 0.40 | X | 0 |

"○" indicates welded and
"X" indicates notwelded in the column of the evaluation of the welding.

It is evident with Tables 5 to 10 that the transmittance, the heat resistance, the bleeding resistance, the laser welding property and the tensile strength of the workpieces of Examples are all excellent.

The mere blended polyolefin thermoplastic elastomer and the dynamic crosslinking polyolefin thermoplastic elastomer are compared. As shown in Table 5, the mere blended polyolefin thermoplastic elastomer: TPO Vyram 9201-65 that is available from Advanced Elastomer Systems Japan Ltd. is unsuitable for material of the laser-transmissible molded workpiece because the laser-transmissible molded workpiece made from this elastomer causes insufficient laser-transmissible property, low dispersibility and coloring property of the colorant. On the other hand, the dynamic crosslinking polyolefin thermoplastic elastomer: TPV A6110, A9110, A8120 or B8130 that is available from Asahi Kasei Chemicals Corporation, and Soft Milastomer or Hard Milastomer that is available from Mitsui Chemicals Corporation are suitable for material of the laser-transmissible molded workpiece because the laser-transmissible molded workpiece made from this elastomer causes sufficient laser-transmissible property, excellent dispersibility and coloring property of the colorant. Furthermore it is evident with Table 6 that the dynamic crosslinking polyolefin thermoplastic elastomer is suitable for also material of the laser-absorptive molded workpiece because the laser-absorptive molded workpiece made from the elastomer causes excellent dispersibility and coloring property of the colorant.

By the way, the dynamic crosslinking polyolefin thermoplastic elastomer prepared with using the metallocene catalyst, the dynamic crosslinking polyolefin thermoplastic elastomer prepared with using Ziegler-Natta catalyst and the mere blended polyolefin thermoplastic elastomer are compared. When the black contents: OD values of the polyolefin thermoplastic elastomers that 0.1% of the same amount of carbon black is added thereto respectively are compared, order of richness of the black contents thereof is as follows showing in Table 6. The first one is dynamic crosslinking polyolefin thermoplastic elastomer: TPV A6110, A9110, B8130 or A8120 that is available from Asahi Kasei Chemicals Corporation and prepared with using the metallocene catalyst. The second one is the dynamic crosslinking polyolefin thermoplastic elastomer: TPV Santoprene 8211-65 that is available from Advanced Elastomer Systems Japan Ltd. and prepared with using Ziegler-Natta catalyst. The third one is the mere blended polyolefin thermoplastic elastomer: Vyram 9201-65 that is available from Advanced Elastomer Systems Japan Ltd. The dynamic crosslinking polyolefin thermoplastic elastomer prepared with using the metallocene catalyst is suitable for material of the laser-absorptive molded workpiece because the laser-absorptive molded workpiece made from this elastomer causes excellent dispersibility and coloring property of the colorant.

The hue of non-colored elastomers by visual observation is as follows. The mere blended polyolefin thermoplastic elastomer indicates the hue of yellow. The dynamic crosslinking polyolefin thermoplastic elastomer prepared with using the Ziegler-Natta catalyst indicates opaqueness and white. And the dynamic crosslinking polyolefin thermoplastic elastomer prepared with using the metallocene catalyst indicates the hue of translucence and is suitable for material of the laser-transmissible molded workpiece because the laser-transmissible molded workpiece made from this elastomer with adding a little colorant causes excellent dispersibility and coloring property of the colorant.

The dynamic crosslinking polyolefin thermoplastic elastomer including ethylene-propylene-diene rubber as main component: TPV Santoprene 8211-65 that is available from Advanced Elastomer Systems Japan Ltd. is more suitable for the material of the laser-transmissible molded workpiece than the mere blended polyolefin thermoplastic elastomer: Vyram 9201-65 that is available from Advanced Elastomer Systems Japan Ltd. However it has more or less insufficient laser-transmittance as the material of the laser-transmissible molded workpiece as compared with the dynamic crosslinking polyolefin thermoplastic elastomer: TPV A6110 and so on that includes ethylene-alpha-olefin copolymer elastomer as main component and is available from Asahi Kasei Chemicals Corporation.

As shown in Table 8, both of the polyolefin thermoplastic elastomers having different hardness respectively such as TPV A6110 having 60 (A) of hardness and TPV A9110 having 90 (A) of hardness that are available from Asahi Kasei Chemicals Corporation are allowed to execute laser welding together. Both of the polyolefin thermoplastic elastomer such as TPV A6110 that is available from Asahi Kasei Chemicals Corporation and the polyolefin thermoplastic resin such as the polypropylene resin filling the talc are also allowed to execute laser welding together.

As shown in Table 9, the laser-welded articles prepared from the laser-transmissible composition of the comparative examples or the laser-absorptive composition of the comparative examples were inferior under the evaluation of the welding. When the dynamic crosslinking polyolefin thermoplastic elastomer that has the melting point ranging from 160 to 210 degrees Centigrade was employed, it caused the high transmissible property, the excellent heat resistance, the non-bleeding property, the excellent laser-welding property and the sufficient tensile strength.

The laser-transmissible composition including the dynamic crosslinking polyolefin thermoplastic elastomer of the present invention has the sufficient laser-transmissible property of the laser of the oscillated wavelength ranging from approximate 800 nm of wavelength by semiconductor laser to approximate 1200 nm of wavelength by yttrium aluminum garnet (YAG) laser. And the laser-transmissible composition causes excellent durability such as heat resistance and light resistance, excellent bleeding resistance: migration resistance, excellent chemical resistance, the vivid hue.

The method for the laser welding of the molded workpieces made from the laser-transmissible composition of the present invention is executed by simple operation certainly. The laser welding achieves the equal or more welding strength, as compared with prior joining of the workpieces made from the thermoplastic elastomer for example by clamping with clamps such as bolts, screws and clips, bonding with a bonding agent, vibration welding, ultrasonic welding. Also it achieves labor saving, improving of productivity, and decreasing of working cost, because of little thermal or vibratory influence. The laser welding of the molded workpieces having intricate shape made from the composition including the same or different thermoplastic elastomer respectively is allowed to apply. The laser welding of the molded workpiece made from the composition including the thermoplastic elastomer and the molded workpiece made from the thermoplastic resin is also allowed to apply.

So the laser welding is applied to joining of workpieces for a precision mechanical equipment, functional workpieces, electric workpieces or electronic workpieces that are due to avoid the thermal or vibratory influence under an automobile industry and an electric or electronic industry.

What is claimed is:

1. A method for laser welding comprising:
preparing a dynamic crosslinking polyolefin thermoplastic elastomer in the presence of a metallocene catalyst including, as a main component, an ethylene-alpha-olefin random copolymer elastomer with a ratio of ethylene to alpha-olefin between 55:45 to 80:20 by weight, the dynamic crosslinking polyolefin thermoplastic elastomer having a melting point ranging from 160 to 210 degrees Centigrade;
dynamically crosslinking the dynamic crosslinking polyolefin thermoplastic elastomer with a crosslinking agent;
providing a laser energy-transmissible molded workpiece comprising a laser energy-transmissible composition comprising the dynamic crosslinking polyolefin thermoplastic elastomer and a dye salt capable of transmitting laser energy having a wavelength of 800 to 1200 nm, wherein the dye salt comprises an anion of an acid dye and a cation of an organic amine and the dye salt is selected from the group consisting of a monoazo dye salt, a disazo dye salt, an anthraquinone dye salt, an anthrapyridone dye salt, and a triphenylmethane dye salt;
providing a laser energy-absorptive molded workpiece comprising a composition comprising a thermoplastic polypropylene resin and a laser energy-absorbent including carbon black;
placing the laser energy-transmissible molded workpiece irradiating a laser towards the laser energy-transmissible molded workpiece to weld the laser energy-transmissible molded workpiece to the laser energy-absorptive molded workpiece.

2. The method for laser welding according to claim 1, wherein the laser energy-transmissible molded workpiece is placed onto the laser energy-absorptive molded workpiece through an applied layer which includes the laser energy-absorbent.

3. The method for laser welding according to claim 1, wherein the laser energy-absorptive molded workpiece comprises a composition further including a dynamic crosslinking polyolefin thermoplastic elastomer.

4. The method for laser welding according to claim 1, wherein the thermoplastic polypropylene resin includes talc.

5. The method for laser welding according to claim 1, wherein the laser is irradiated by scanning, and thereby supplying a quantity of heat: $K(J/mm^2)$ to a surface of the laser energy-absorptive molded workpiece, said quantity of heat corresponding to the following numerical expression (I):

$$K=(p \times T)/(100 \times q \times d) \geqq 0.5 \qquad (I)$$

wherein $p(W)$ is an output of the laser, $T(\%)$ is a transmittance of the laser energy-transmissible molded workpiece under irradiation of the laser, $q(mm/sec.)$ is a scanning speed of the laser, and $d(mm)$ is the diameter of a spot of the laser irradiating onto the surface.

6. The method for laser welding according to claim 1, wherein the dynamic crosslinking polyolefin thermoplastic elastomer exhibits a compressive strain ranging from 20 to 70% at 100 degrees Centigrade in accordance with Japanese Industrial Standard K-6262-1997.

7. The method for laser welding according to claim 1, wherein the dynamic crosslinking polyolefin thermoplastic elastomer has a Shore hardness between 60 and 90 (A).

8. The method for laser welding according to claim 1, wherein the dynamic crosslinking polyolefin thermoplastic elastomer in the laser energy-transmissible molded workpiece has an optical density of at least 1.5 with less than 0.1% of additive content thereof by weight.

9. The method for laser welding according to claim 1, wherein the organic amine is selected from the group consisting of alicyclic amine and guanidine derivative.

10. The method for laser welding according to claim 9, wherein the guanidine derivative is selected from the group consisting of 1,3-diphenylguanidine, 1-o-tolylguanidine, and di-o-tolylguanidine.

11. The method for laser welding according to claim 1, wherein the carbon black has a primary particle size between 18 and 30 nm.

12. The method for laser welding according to claim 1, wherein the laser energy-absorbent further includes nigrosine dyestuff.

13. The method for laser welding according to claim 1, wherein the crosslinking agent is selected from the group consisting of an organic peroxide, a phenol resin compound, a quinoid compound, a sulfur compound and a bismaleimide compound.

* * * * *